(12) United States Patent
Nishioka

(10) Patent No.: US 6,315,583 B1
(45) Date of Patent: Nov. 13, 2001

(54) CARD CONNECTOR HAVING A CARD DISCHARGE MECHANISM

(75) Inventor: Toru Nishioka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/677,808

(22) Filed: Oct. 3, 2000

(30) Foreign Application Priority Data

Oct. 4, 1999 (JP) .................................................. 11-283531

(51) Int. Cl.⁷ .......................... H01R 13/44; H01R 13/60; H01R 11/30
(52) U.S. Cl. .............................................. 439/131; 439/40
(58) Field of Search ............................ 439/131, 40, 152, 439/153, 154, 155, 156, 157, 158, 159, 160, 258

(56) References Cited

U.S. PATENT DOCUMENTS 6,095,835 * 8/2000 Oguchi .................................. 439/159

FOREIGN PATENT DOCUMENTS 11-135192    5/1999  (JP) .

* cited by examiner

Primary Examiner—Brian Sircus
Assistant Examiner—Chandrika Prasad
(74) Attorney, Agent, or Firm—Brinks Hofer Gilson & Lione

(57) ABSTRACT

The invention provides a card connector with a card discharging mechanism, in which a data storage card does not exit from the card connector due to the biasing force of a spring member, and in which the card can be easily extracted without weakening the biasing force of the spring member. The card connector includes a housing, an eject arm, a slide member, a return spring, a retaining member and an operation restricting mechanism. The data storage card may be attached and detached to and from the housing. The eject arm engages with the card and is rotatable in the card inserting and discharging directions. The slide member, to which the eject arm is mounted, slides in the card inserting and discharging directions. The return spring biases the slide member in the card discharging direction. The retaining member retains the slide member at a card insertion position against the biasing force of the return spring. The operation restricting mechanism restricts the movement of the eject arm during the sliding of the slide member.

37 Claims, 21 Drawing Sheets

CARD CONNECTOR HAVING A CARD DISCHARGE MECHANISM

BACKGROUND OF THE INVENTION

1. Field of the Invention

The invention generally relates to removable data storage systems. More particularly, the invention relates to card connectors for use with data storage cards such as an integrated (IC) card used in a storage medium for a personal computer or the like and a flash memory card for use in an electronic apparatus such as a digital camera.

2. Description of the Related Art

Data storage cards provide portable memory for electronic devices and include integrated circuit (IC) cards, flash memory cards such as Compactflash (CF) cards, I/O cards, and other removable memory storage cards or systems. Data Storage cards are used in various electronic devices including personal computers, digital cameras, cellular telephones, facsimile machines, and the like.

An electronic device uses a card connector to read and write data to a data storage card. Typically, the data storage card is slid or inserted into a compartment formed by the card connector. Electrical contacts on the data storage card engage electrical connectors on the card connector, which connect to the electronic device.

Many card connectors have a discharge mechanism to discharge the data storage card, thus improving operability when attaching or detaching the data storage card. A conventional integrated circuit (IC) card discharge mechanism usually has a slide member for conveying and IC card. The slide member has a lock mechanism portion and a spring member. The lock mechanism portion retains the IC card at an attachment position. The spring member biases the slide member in a discarge direction when the lock mechanism portion is released. The IC card is pushed out of the card connector in a discharge direction by the biasing force of the spring member.

In many conventional IC card connectors, the spring member biasis the IC card in the discharge direction together with the slide member for conveying the IC card. The biasing force of the spring member against the slide member may cause the IC card to exit completely and unexpectedly from the IC card connector in which case the IC card may be damaged or lost.

To prevent the IC card from exiting completely when relevant from the card connector, the biasing force of the spring member may be adjusted. However, when the biasing force of the spring member is weakened, it is difficult to obtain the requisite stroke for discharging the IC card. As a result, it is often difficult to extract the IC card.

Accordingly, there is a need for a card connector having the requisite stroke to discharge a data storage card and to keep the data storage card from exiting the card connector when released.

SUMMARY OF THE INVENTION

The invention provides a card connector with a card discharge mechanism, in which a data storage card does not exit from the card connector due to the biasing force of the spring member, in which the biasing force of the spring member biasing the slide member is not weakened, and in which the card is easily extracted.

In one aspect, the card connector includes a housing, an eject arm, a slide member, a return spring, a retaining member, and an operation restriction device. In one aspect, the card connector includes a data storage card that attaches and detaches to and from the housing. The data storage card may be any removable memory device such as an integrated circuit (IC) card and a flash memory card.

The housing has a compartment or an accommodating portion configured to receive the card. The eject arm may engage the card and may be provided to be rotatable in the card inserting and discharging directions of the housing. The eject arm may be mounted on the slide member, which can slide in the card inserting and discharging directions. The return spring may bias the slide member in the card discharging direction. A retaining member may retain the slide member at a card insertion position against the biasing force of the return spring.

The operation restricting mechanism may restrict the movement of the eject arm during the sliding of the slide member. The operation restricting mechanism may have a rotation restricting portion to restrict the rotation of the eject arm during the sliding of the slide member in the card inserting and discharging directions. The operation restricting mechanism may have a rotation permitting portion to permit the rotation of the eject arm after the slide member stops sliding at a discharge position in the card discharge direction.

In one aspect, the card connector also has a coil spring against which the slide member abuts when the slide member moves to the card discharging position. The coil spring may effect positioning, and may draw out the card. The eject arm and the slide member may move in the discharging direction due to the deflection of the coil spring. The eject arm may rotate with this movement.

The card connector may move the card from the discharge position to the card attaching position, the slide member may move the card in the card discharging direction. The card may be extracted when the slide member has moved to the card discharging position. The movement of the eject arm may be restricted by the operation restricting mechanism such that the card can be attached again from the discharge position to the card attaching position.

In one aspect, the eject arm has first and second arm portions. When inserting the card, the first arm portion may engage the card to rotate the eject arm. When discharging the card, the second arm portion may engage the card to rotate the eject arm.

The operation restricting device may comprise a cam pin and a stationery member. The cam pin may be provided on the eject arm. The stationary member may be equipped with a cam groove portion engaged to the cam pin.

The stationary member may be formed by the housing. The stationary member also may be formed by a frame mounted to the housing.

The cam groove portion may have a loop-like configuration. The first rotation restricting device may have a first longitudinal groove and a first inclined groove. The first longitudinal groove may extend along the sliding direction of the slide member. The first inclined groove may be connected to the first longitudinal groove. The second rotation restricting device may have a second longitudinal groove and a second inclined groove. The second longitudinal groove may extend parallel to the first longitudinal groove. The second inclined groove may connect to the second longitudinal groove. The rotation permitting portion may have a lateral groove connected to the end portion of the second inclined groove. The lateral groove may be connected to the end portion of the first longitudinal groove.

In one aspect, the card connector has a stopper portion formed on the wall portion of the connecting portion between the first longitudinal groove and the first inclined groove. The stopper portion may abut the cam pin and may prevent the cam pin from moving in the inserting direction when the card is inserted upside down or in the reverse direction.

When inserting the card, the slide member may move in the inserting direction. The first arm portion may be engaged with the card. During movement of the slide member, the cam pin may move along the first longitudinal groove and the first inclined groove, which in one aspect constitutes the first rotation restricting portion. The eject arm may rotate while being restricted in its movement. The second arm portion may engage a recess provided in the card. The slide member may be locked by the retaining member to retain the card at the attaching position. When discharging the card, the slide member may move in the discharging direction. The second arm portion may be engaged with the card with the releasing of the lock of the retaining member. During the movement of the slide member, the cam pin may move along the second longitudinal groove and the second inclined groove, which in one aspect constitutes the second rotation restricting member. The eject arm may rotate while being restricted in its movement. The slide member may abut the coil spring at the card discharge position stopping the rotation of the eject arm. The card may be retained at the discharge position by the second arm portion. When extracting the card from the discharge position, the eject arm and the slide member may move in the card discharge direction against the biasing force of the coil spring. The cam pin may move along the lateral groove, which in one aspect constitutes the rotation permitting portion. The eject arm may rotate. The engagement of the second arm portion and the card may be released, thus making it possible to discharge the card in the discharge direction.

Other systems, methods, feature, and advantages of the invention will be or will become apparent to one skilled in the art upon examination of the following section figures and detailed description. All such additional systems, methods, features, and advantages are intended to be included within this description, within the scope of the invention, and protected by the accompanying claims.

BRIEF DESCRIPTION OF THE DRAWINGS

The invention may be better understood with reference to the following section figures and detailed description. The components in the figures are not necessarily to scale, emphasis placed upon illustrating the principles of the invention. Moreover, like reference numerals in the figures designate corresponding parts throughout the different views.

DESCRIPTION OF THE PREFERRED EMBODIMENT

Figure 1:
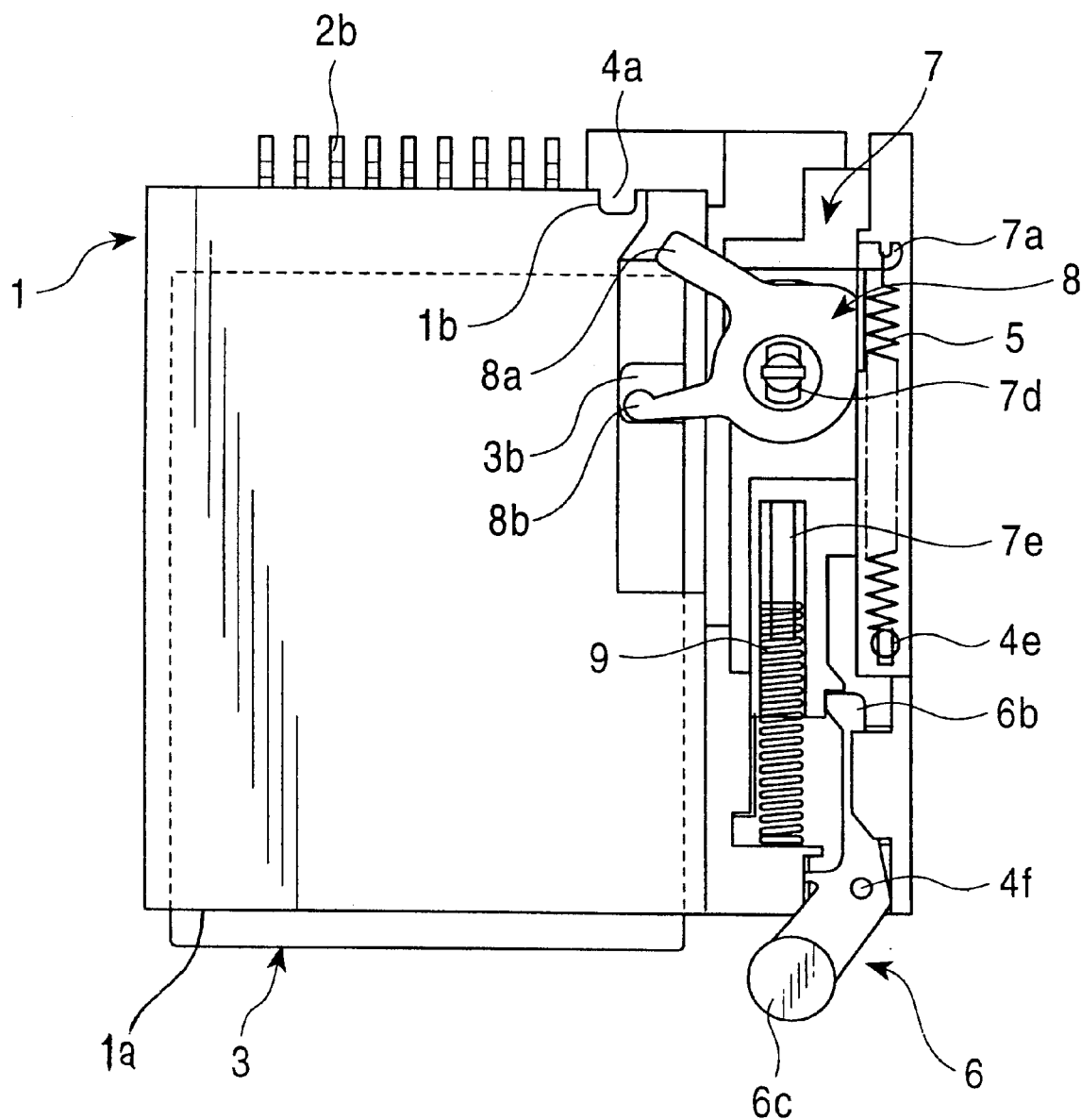
FIG. 1 is a plan view of a data storage card inserted into a card connector according to an embodiment of the invention.
Figure 2:
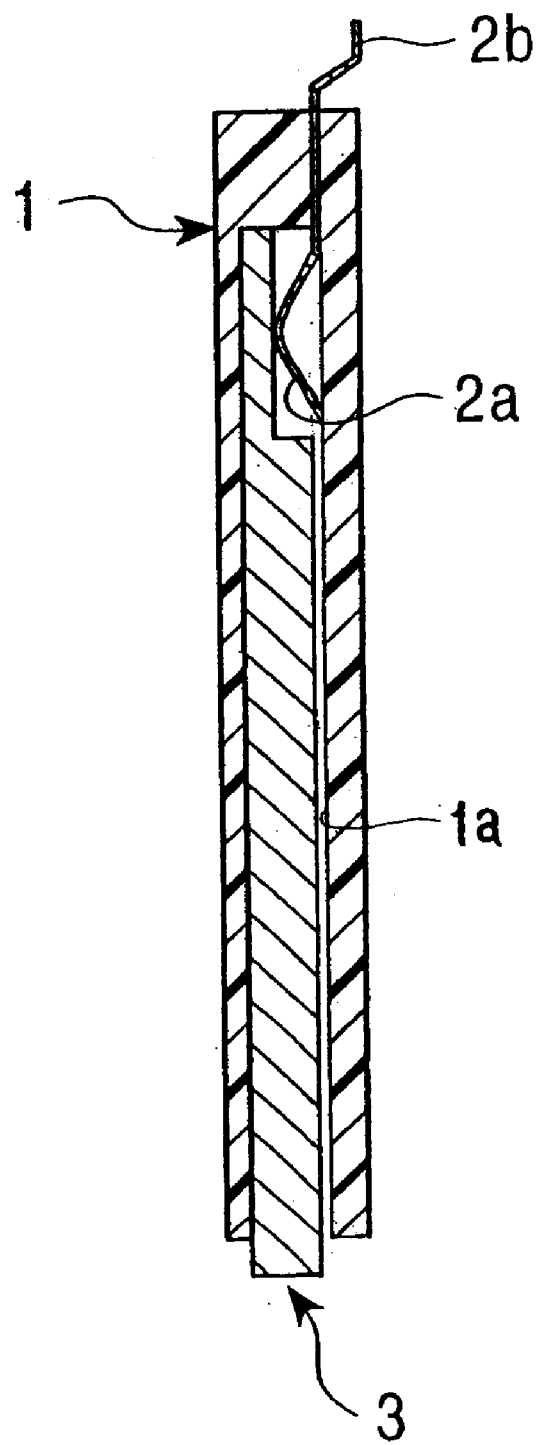
FIG. 2 is a sectional view of FIG. 1.
Figure 3:
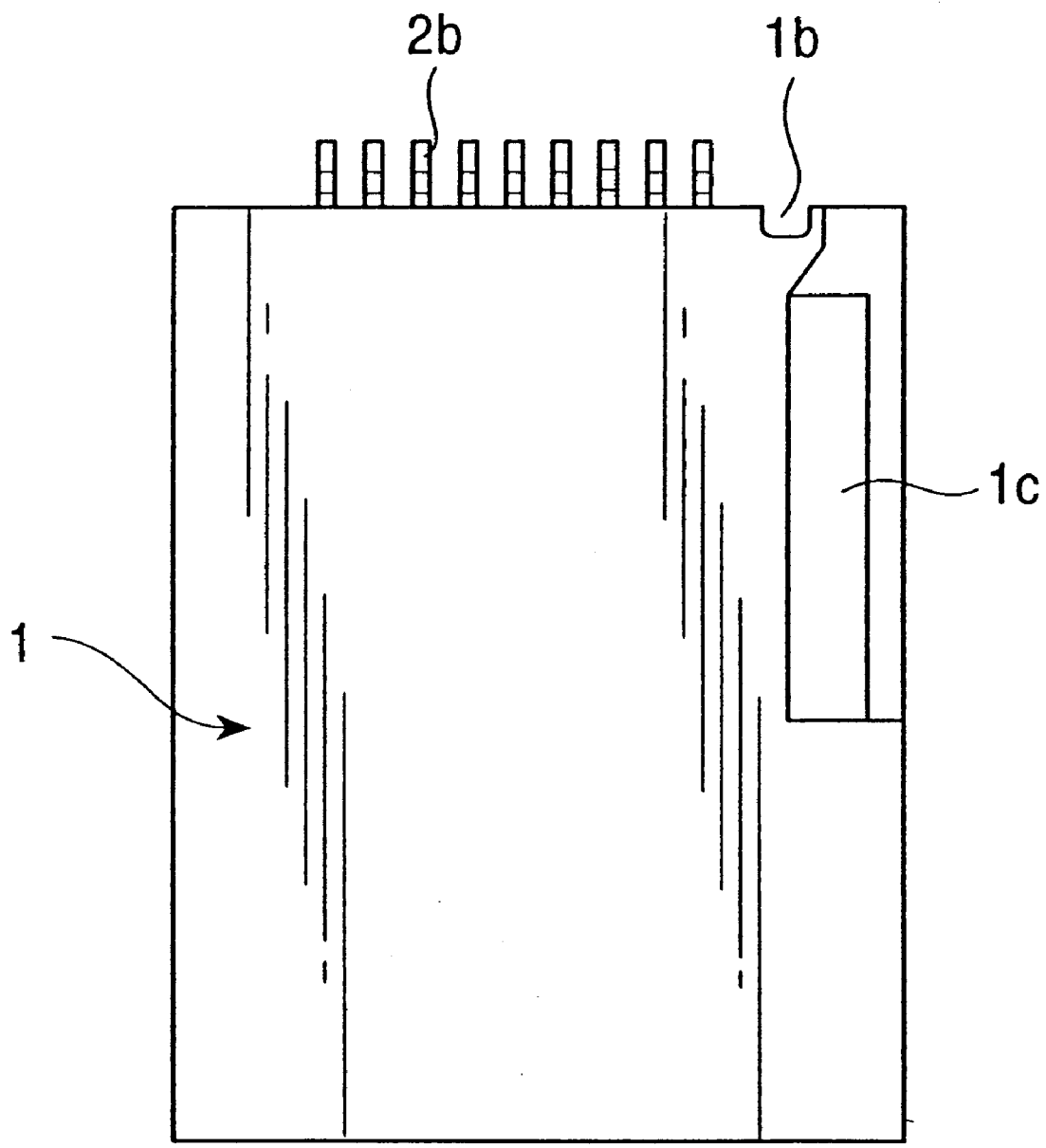
FIG. 3 is a plan view of a housing according to an embodiment of the invention.
Figure 4:
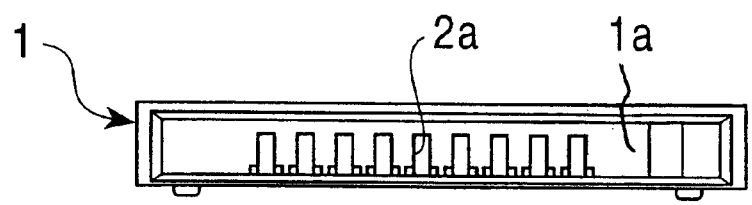
FIG. 4 is a front view of a housing according to an embodiment of the invention.
Figure 5:
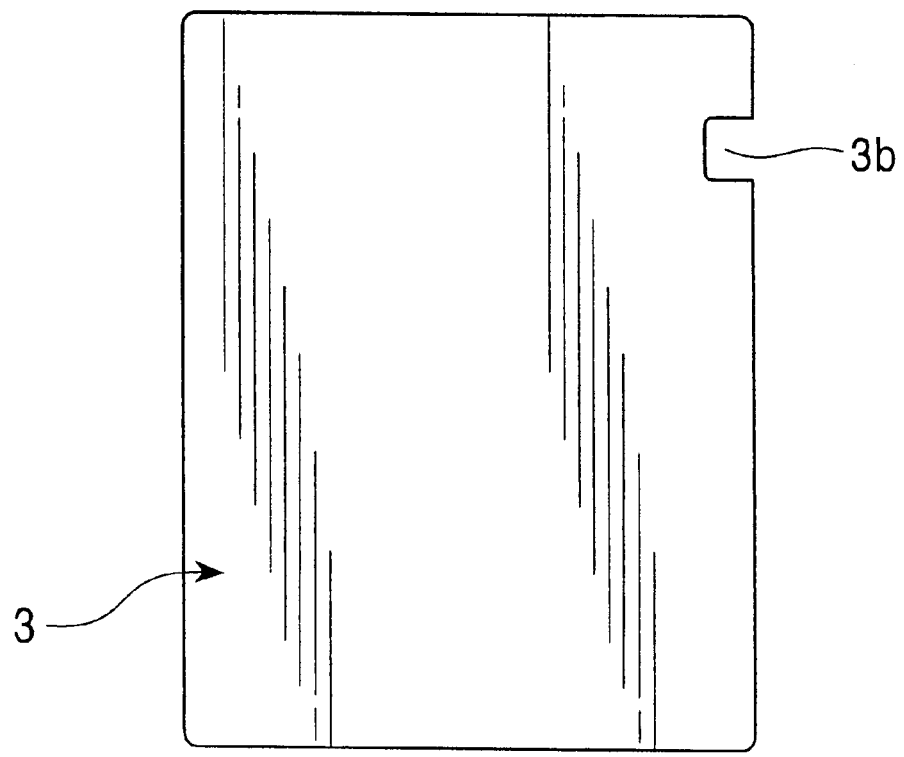
FIG. 5 is a plan view of a data storage card according to an embodiment of the invention.
Figure 6:
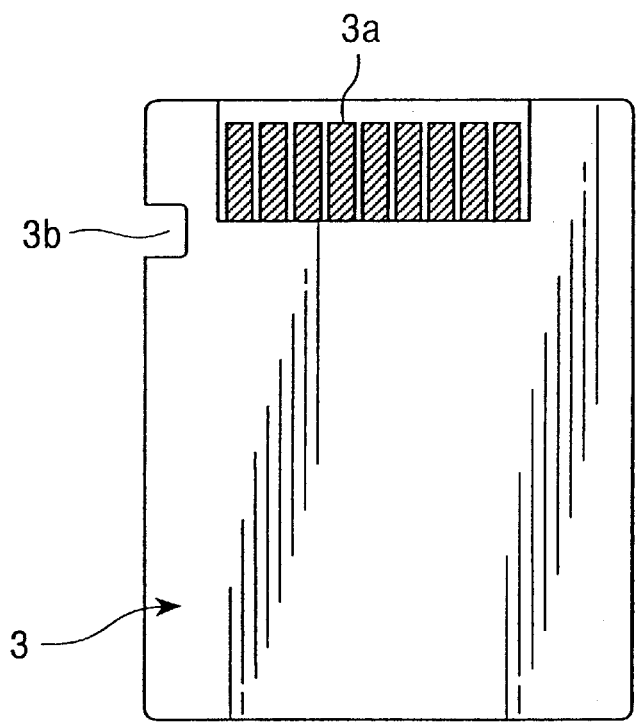
FIG. 6 is a bottom view of a data storage card according to an embodiment of the invention.
Figure 7:
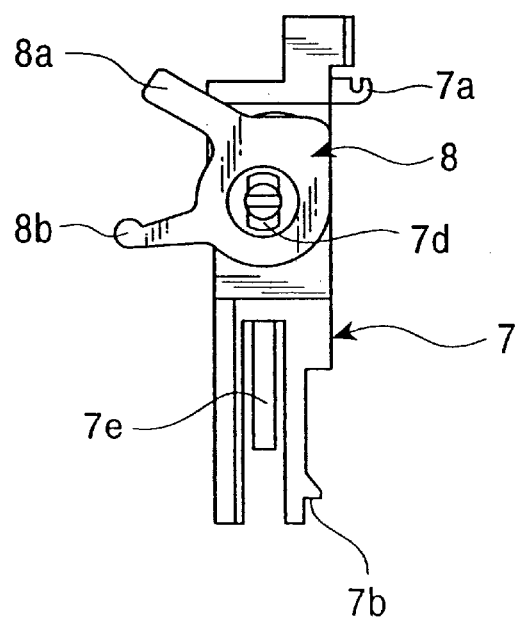
FIG. 7 is a plan view of a slide unit portion according to an embodiment of the invention.
Figure 8:
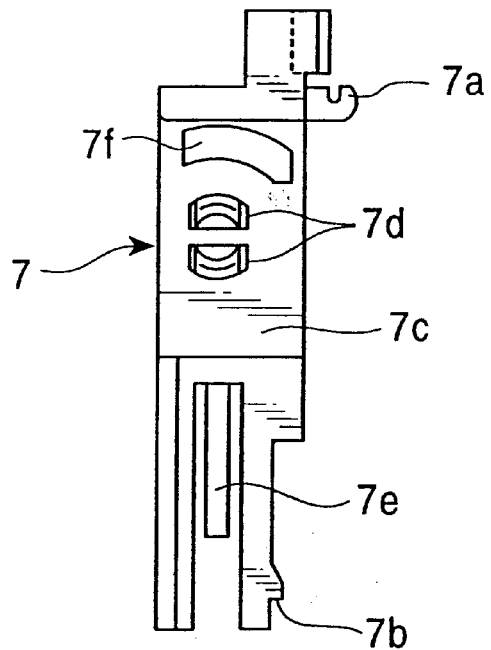
FIG. 8 is a plan view of a slide member according to an embodiment of the invention.
Figure 9:
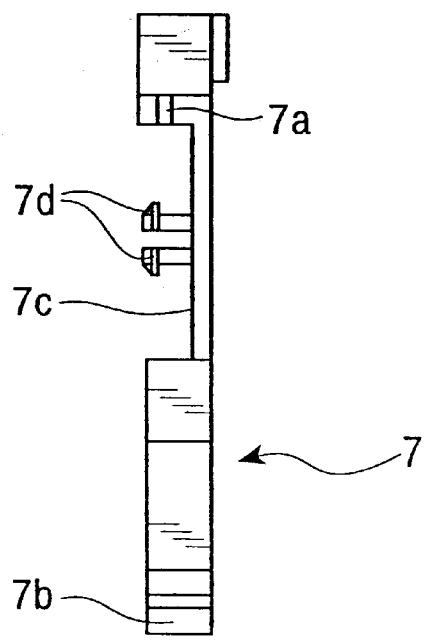
FIG. 9 is a side view of a slide member according to an embodiment of the present invention.
Figure 10:
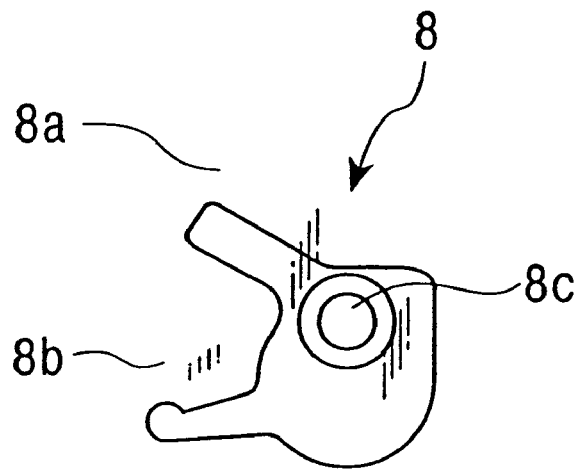
FIG. 10 is a plan view of an eject arm according to an embodiment of the present invention.

An embodiment of the invention will now be described with reference to FIGS. 1 through 27. FIG. 1 is a plan view of a data storage card inserted into a card connector according to an embodiment of the invention. FIG. 2 is a sectional view of FIG. 1. FIG. 3 is a plan view showing a housing. FIG. 4 is a front view of a housing. FIG. 5 is a plan view of a data storage card. FIG. 6 is a bottom view of a data storage card. FIG. 7 is a plan view showing a slide unit. FIG. 8 is a plan view showing a slide member. FIG. 9 is a side view of a slide member. FIG. 10 is a plan view showing an eject arm.

Figure 11:
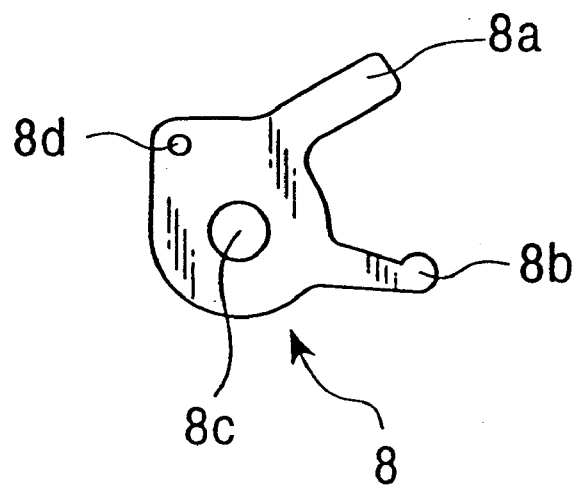
FIG. 11 is a bottom view of an eject arm according to an embodiment of the invention.
Figure 12:
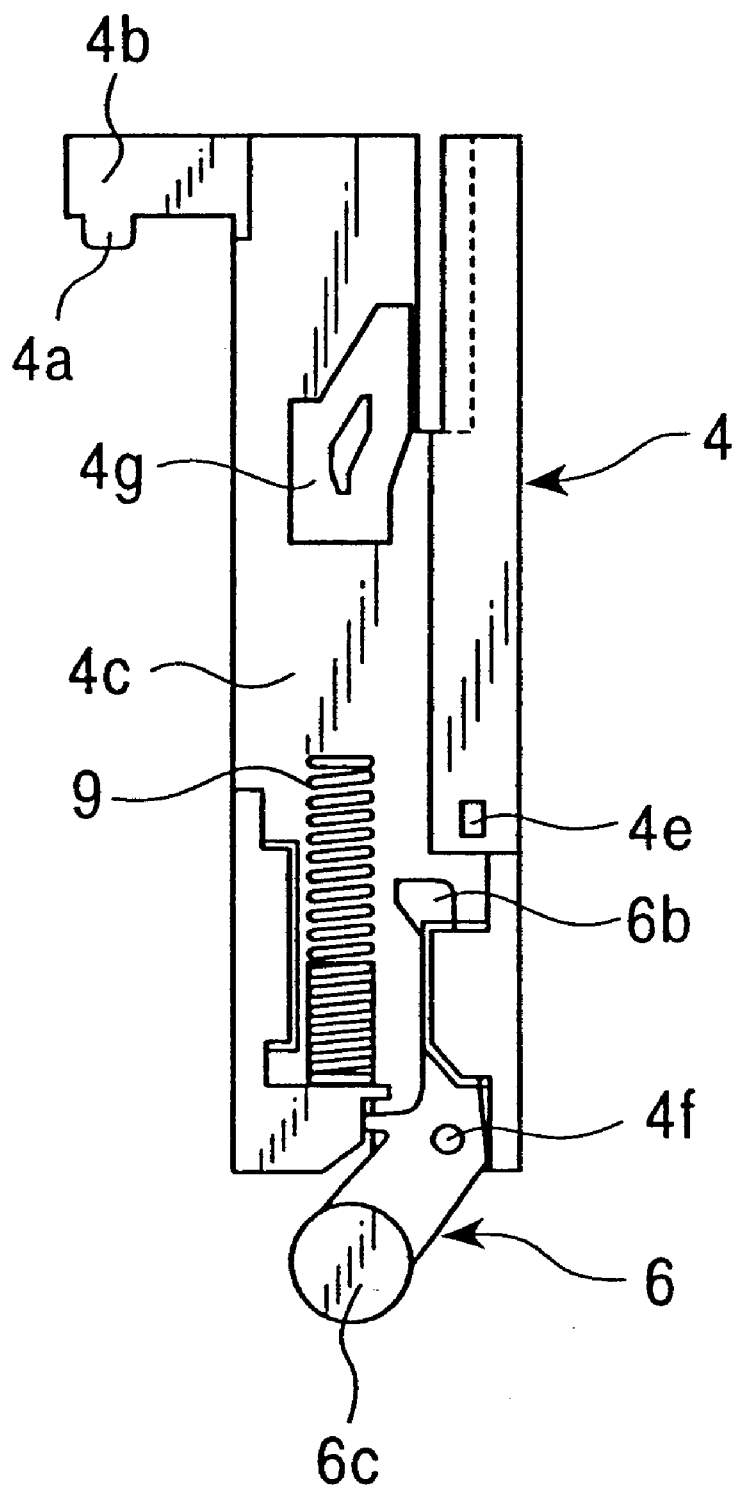
FIG. 12 is a plan view of an eject mechanism portion according to an embodiment of the invention.
Figure 13:
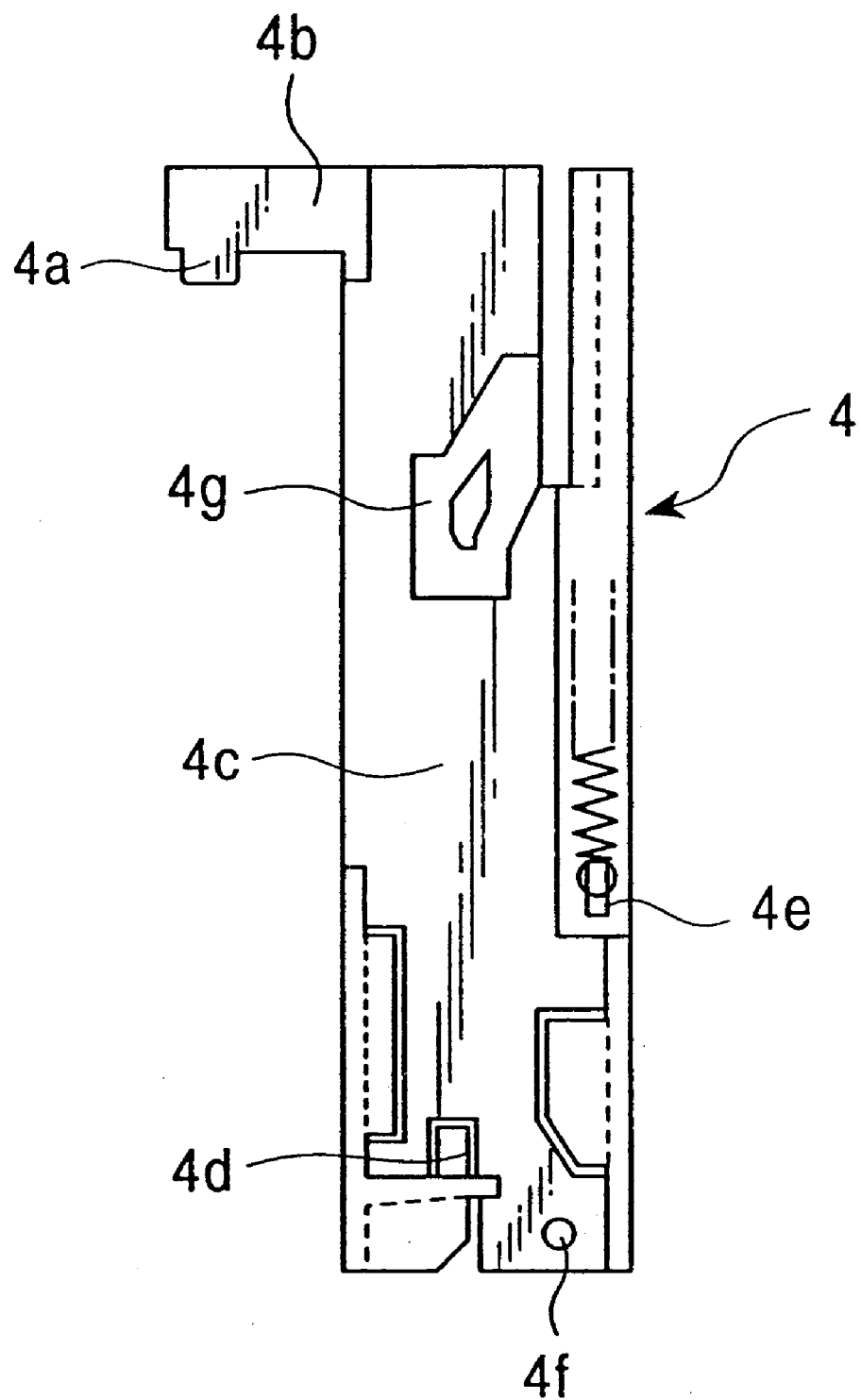
FIG. 13 is a plan view of a frame according to an embodiment of the invention.
Figure 14:
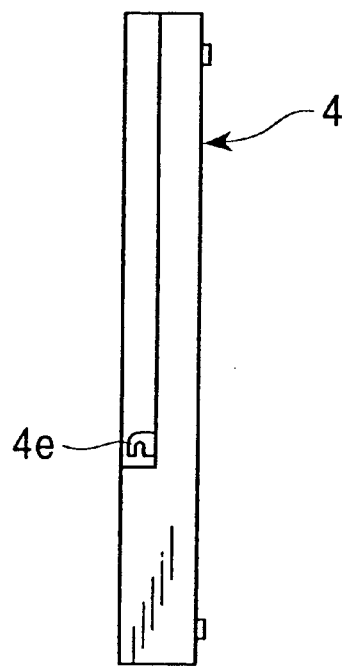
FIG. 14 is a side view of a frame according to an embodiment of the invention.
Figure 15:
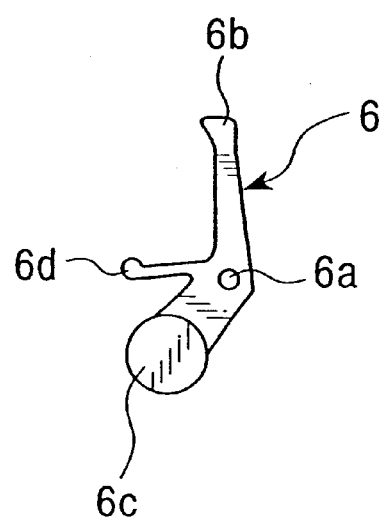
FIG. 15 is a plan view of a retaining member according to an embodiment of the invention.
Figure 16:
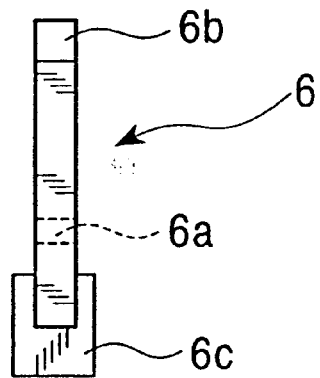
FIG. 16 is a side view of a retaining member according to an embodiment of the invention.
Figure 17:
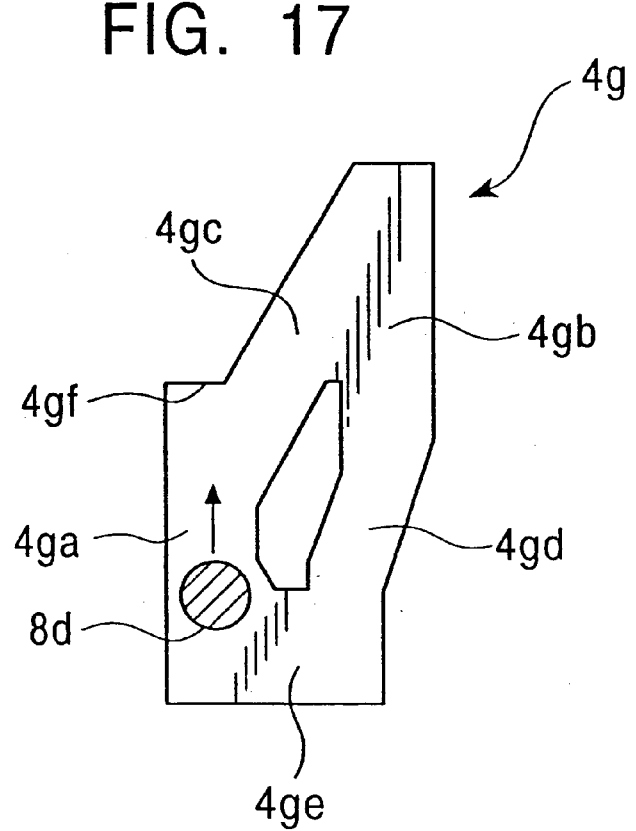
FIG. 17 is a plan view of a cam groove portion according to an embodiment of the invention.

FIG. 11 is a bottom view of an eject arm. FIG. 12 is a plan view of an eject mechanism portion. FIG. 13 is a plan view of a frame. FIG. 14 is a side view of a frame. FIG. 15 is a plan view showing a retaining member. FIG. 16 is a side view of a retaining member. FIG. 17 is a plan view of a cam groove portion.

A housing 1 may be made of an insulating material such as synthetic resin. The housing 1 is equipped with an accommodating portion 1a into which a card 3 described below is inserted and accommodated therein. Arranged on the inner bottom of the accommodating portion 1a are a plurality of contact terminals 2a, which may be made of a conductive metal material. The other ends of these contact terminals 2a are led out of the housing 1 to form connection terminals 2b, which may be connected to a circuit pattern such as an external circuit board (not shown).

At one end of the housing 1 (See FIG. 3.), a mounting recess 1b engaged with a frame 4 described below to mount the frame 4 to the housing 1. Further, close to this mounting recess 1b, a cutout portion 1c is provided at one end of the housing. Due to the provision of this cutout portion 1c, the rotation of arm portions 8a and 8b of an eject arm 8 described below is not hindered when rotating the eject arm 8.

The card 3 may be any data storage card. In one aspect, the card 3 accommodates an integrated circuit(IC), which is known in the art for use as a recording medium. On the bottom side of the card 3, there are formed at one end a plurality of contact portions 3a (See FIG. 6). These contact portions 3a come into contact with the plurality of contact terminals 2a provided in the accommodating portion 1a of the housing 1 (See FIG. 2. and FIG. 4.). Various kinds of information processing may be performed between the card 3 and an externally connected electronic apparatus (not shown).

Further, the card 3 has on one side thereof a recess 3b to be engaged with the second arm portion 8b of the eject arm 8 described below (See FIG. 6.).

The frame 4 may be a substantially rectangular configuration and may be made of an insulating material such as synthetic resin. At the forward end of the frame 4, there is provided a mounting arm portion 4b having a mounting protrusion 4a which is integrally mounted to the housing 1 (See FIG. 1 and FIG. 12). Further, in substantially the central portion of the frame 4, there is provided a recess-like flat portion 4c. A slide member 7 described below is arranged on this flat portion 4c. At the lower end of the flat portion 4c, there is provided an engagement protrusion 4d to be engaged with one end of a coil spring 9 described below. In the central side portion, there is provided a hook portion 4e to be engaged with a return spring 5 for returning the slide member 7. Further, at the lower end of the flat portion 4c, there is provided an engagement shaft 4f to be engaged with a retaining member 6 described below.

Further, in the flat portion 4c, there is provided a loop-like cam groove 4g (See FIG. 17). This loop-like cam groove 4g comprises a first longitudinal groove 4ga a second longitudinal groove 4gb, a first inclined groove 4gc, a second inclined groove 4gd, and a lateral groove 4ge. The longitudinal groove 4ga linearly extends along the moving direction of the slide member 7 described below a second longitudinal groove 4gb linearly extending parallel to the first longitudinal groove 4ga. The first inclined groove 4gc obliquely extends from the first longitudinal groove 4ga side to the second longitudinal groove 4gb side. The second inclined groove 4gd extends opposite to the first inclined groove 4gc. The lateral groove 4ge extends in parallel from the other end of the second inclined groove 4gd to the other end of the first longitudinal groove 4ga.

Further, a stopper portion 4gf may be provided on the wall portion of the connecting portion between the first longitudinal groove 4ga and the first inclined groove 4gc. The stopper portion 4gf may abut a cam pin 8d described below to prevent the movement of the cam pin 8d in the inserting direction when the card 3 is inserted upside down or reversely.

The retaining member 6 may be made of an insulating member such as synthetic resin. At the center of the retaining member 6 (See FIG. 15 and FIG. 16), there is provided an engagement hole 6a to be engaged with the engagement shaft 4f of the frame 4 (See FIG. 1 and FIG. 12). At the forward end of the retaining member 6, there is provided a lock member 6b, which comes into contact with the slide member 7 described below to lock the slide member 7. On the opposite side of the lock member 6b, there is provided an operating portion 6c for operation when canceling the lock. Further, in the central portion, there is integrally formed an arm spring 6d for self-return of the retaining member 6.

The slide member 7 may have a substantially rectangular configuration and may be made of an insulating material such as synthetic resin. At the forward end of the slide member 7 (See. FIG. 8. and FIG. 9), there is formed a hook portion 7a to be engaged with one end of the return spring 5 engaged with the frame 4. On the opposite side of the hook portion 7a, there is provided a lock recess 7b to be engaged with the lock member 6b provided on the retaining member 6. Further, substantially at the center of the slide member 7, there is provided an opening 7c. At the center of the opening 7c, there protrudes a shaft portion 7d to which an eject arm 8 described below is rotatably mounted. Further, below the opening 7c, there is provided a bar-like spring retaining portion 7e engaged with a coil spring described below and retaining the same. Further at one end of the opening 7c, there is provided a through-hole 7f through which a cam pin 8d described below is passed.

The slide member 7 is arranged in the flat portion 4c of the frame 4 (See FIG. 1). The slide member 7 is mounted so as to be vertically movable on the frame 4, that is, in the inserting and discharging directions of the card 3, by the return spring 5.

The eject arm 8 may be formed substantially in a disc-like configuration and may be made of an insulating material such as synthetic resin. The eject arm 8 has first and second arm portions 8a and 8b extending outwardly from the disc-like portion (See FIG. 10 and FIG. 11). The first arm portion 8a is provided so as to be engaged with the forward end portion of the card 3 when the card 3 is inserted. The forward end portion of the second arm portion 8b has a substantially round configuration and adapted to be engaged with the recess 3b formed on one side of the card 3. The engagement and disengagement may be effected with the forward end portion of the arm rotating in the recess 3b.

The eject arm 8 has at its center an axial hole 8c, through which the shaft portion 7d formed on the slide member 7 is inserted and snap-fitted. The eject arm 8 is mounted so as to be rotatable around the shaft portion 7d (See FIG. 7). Further, in one side surface portion of the eject arm 8 (See FIG. 11), there is formed a pin-like cam pin 8d adapted to move in the cam groove 4g provided in the frame 4.

The coil spring 9, which may be a compression spring and may be made of a metal wire material, is provided between the engagement protrusion 4*d* of the frame 4 and the spring retaining portion 7*e* of the slide member 7 (See FIG. 1, FIG. 12, and FIG. 13). The coil spring may serve as a stopper when the slide member 7 moves in the discharging direction. The coil spring 9 may serve as a biasing member for biasing the slide member 7 in the inserting direction.

Next, the operation of the card connector described above will be described with reference to FIGS. 18 through 27.

Figure 18:
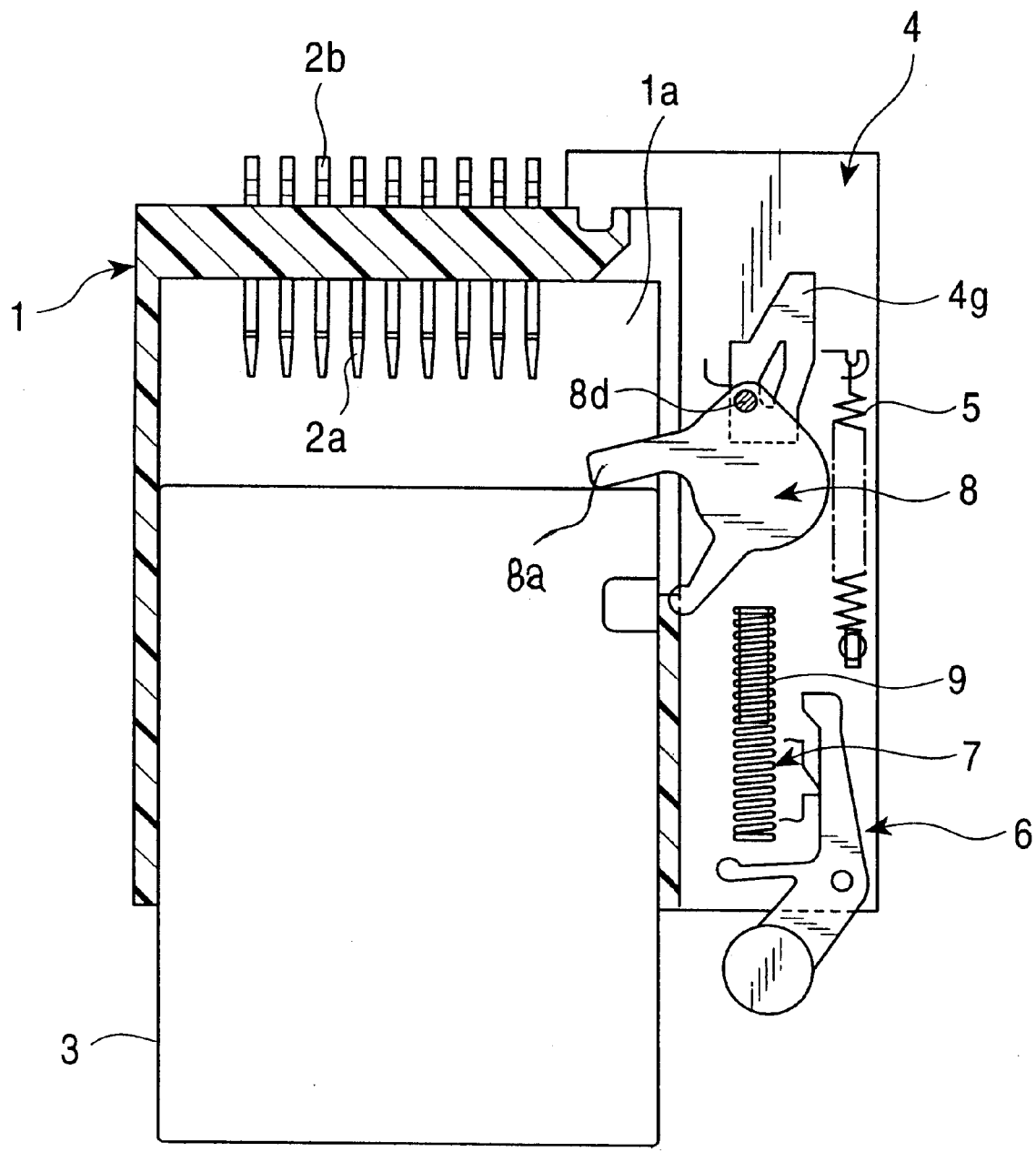
FIG. 18 is a plan view of a data storage initialing card inserted into a housing of a card connector according to an embodiment of the invention.
Figure 19:
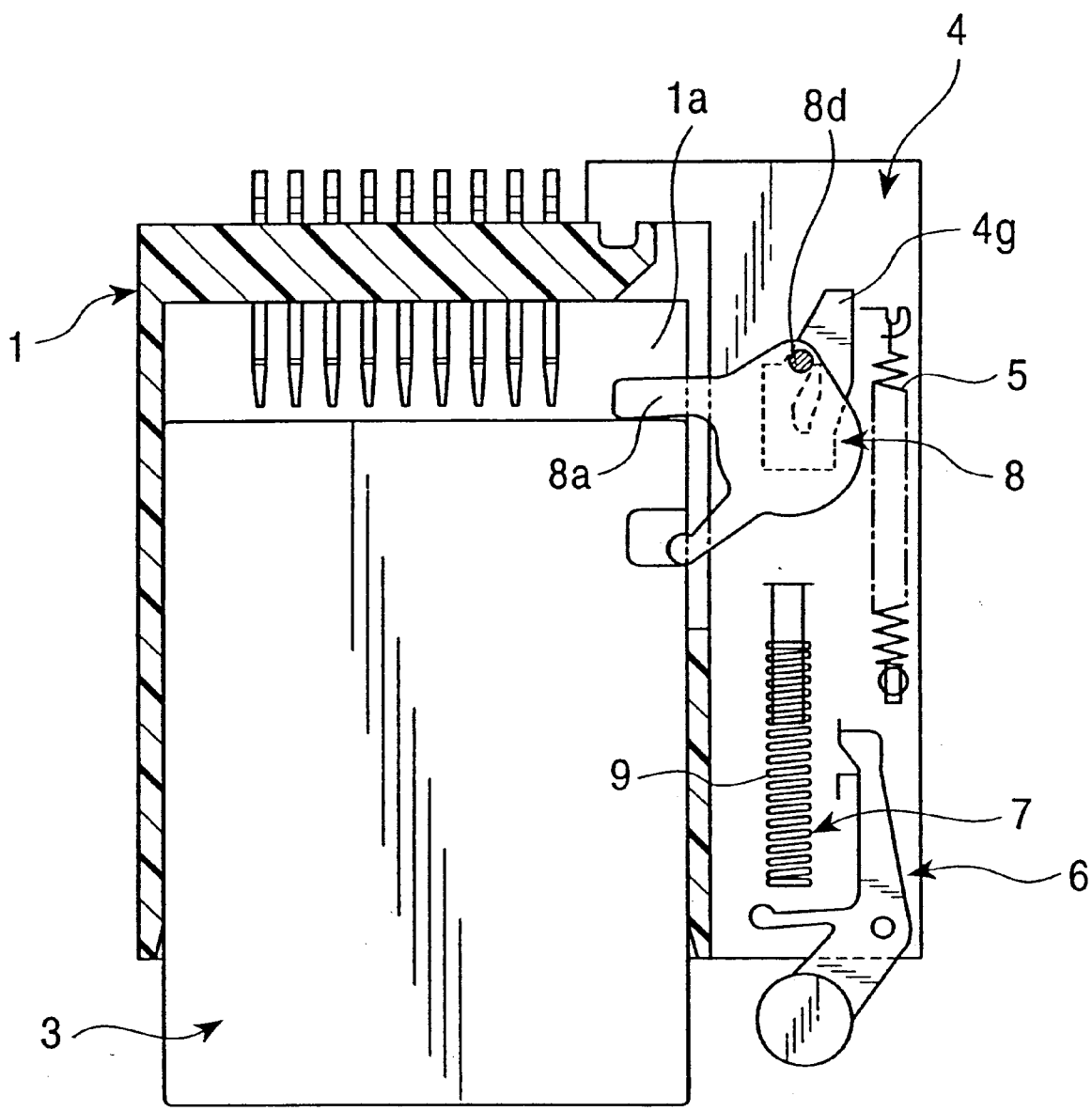
FIG. 19 is a plan view of a data storage card inserted into a housing of a card connector according to an embodiment of the invention.
Figure 20:
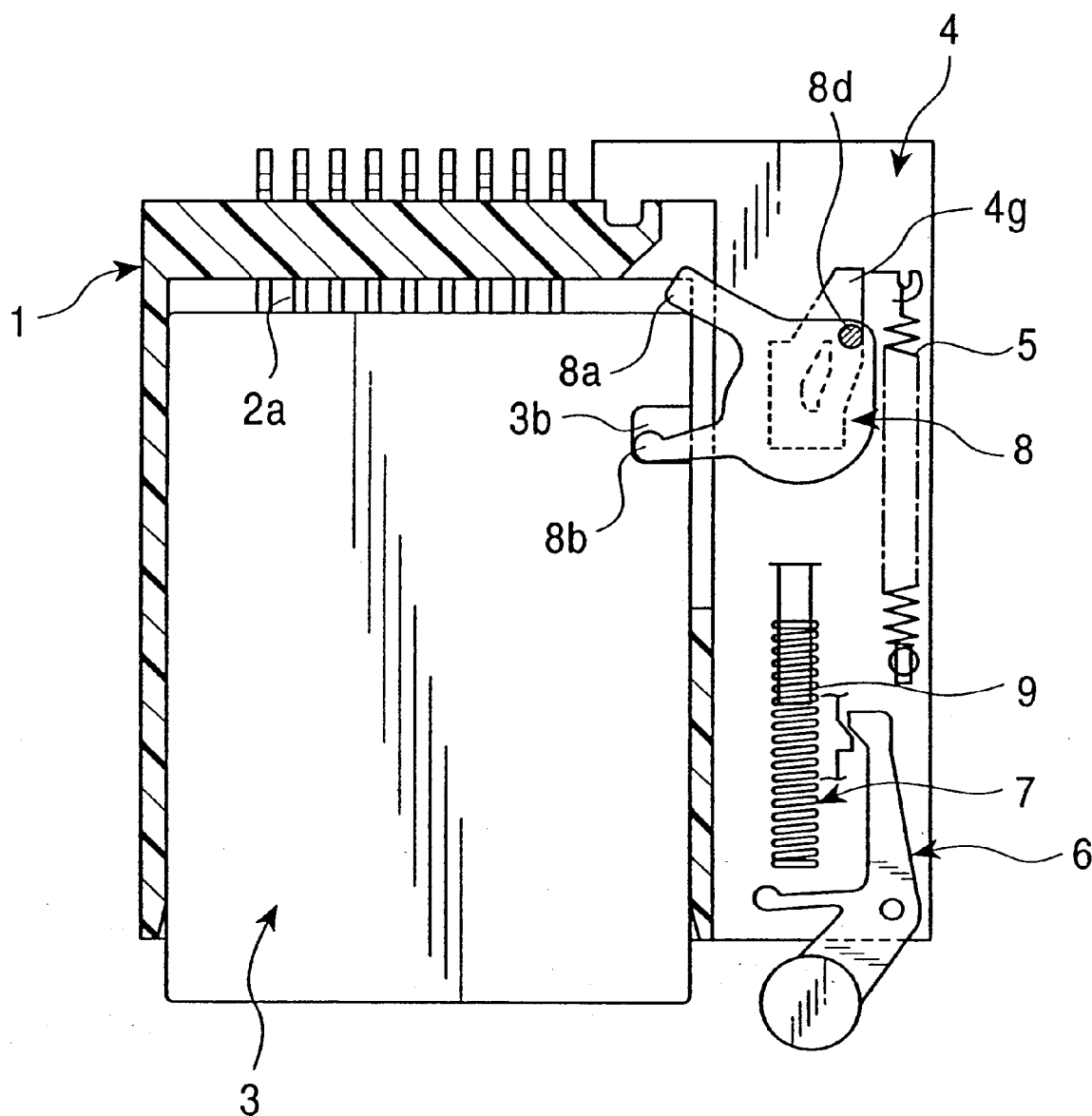
FIG. 20 is a plan view of a data storage card engaging a second arm portion of a card connector according to an embodiment of the invention.
Figure 21:
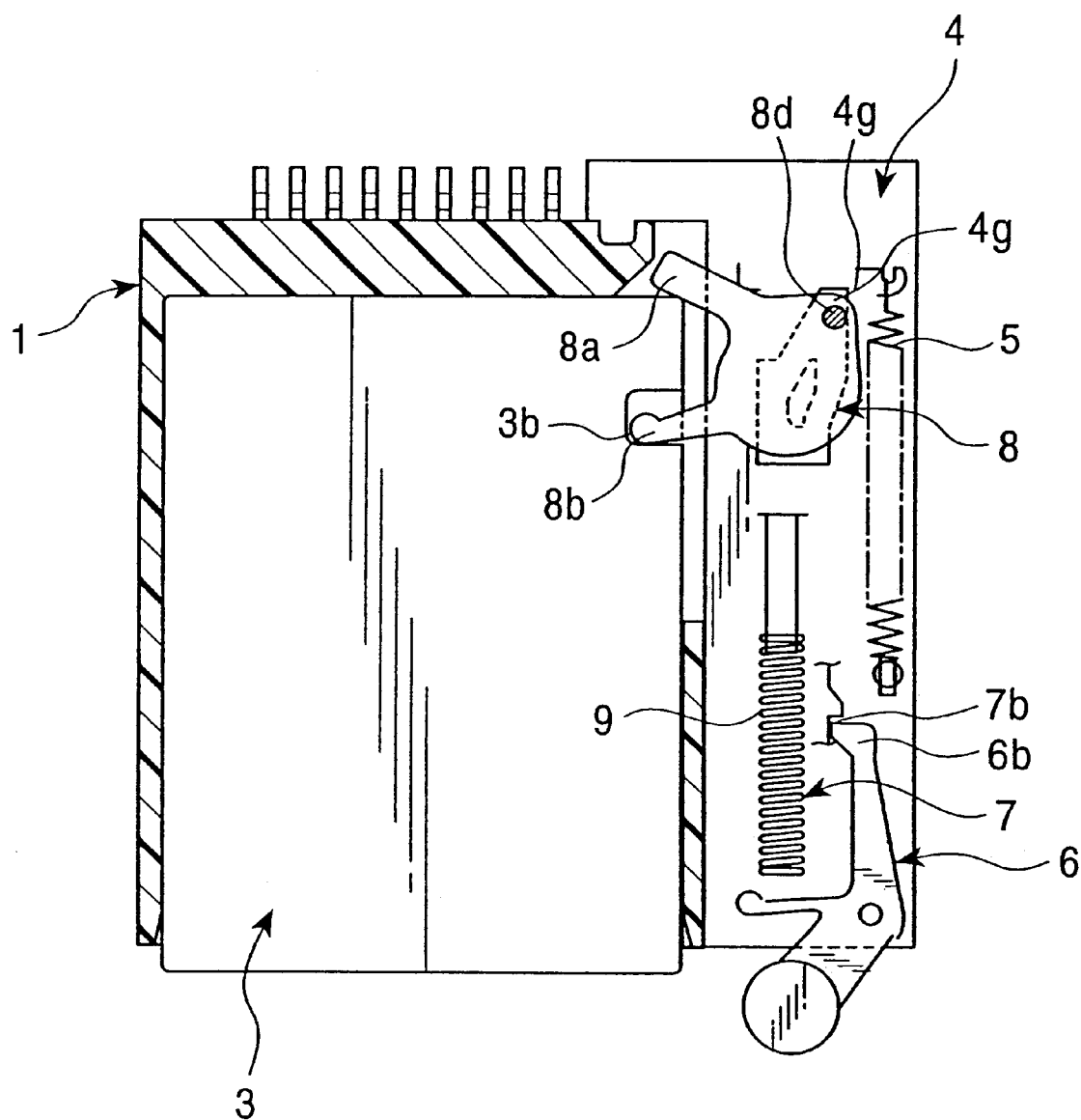
FIG. 21 is a plan view of a data storage card inserted in a card connector according to an embodiment of the invention.
Figure 22:
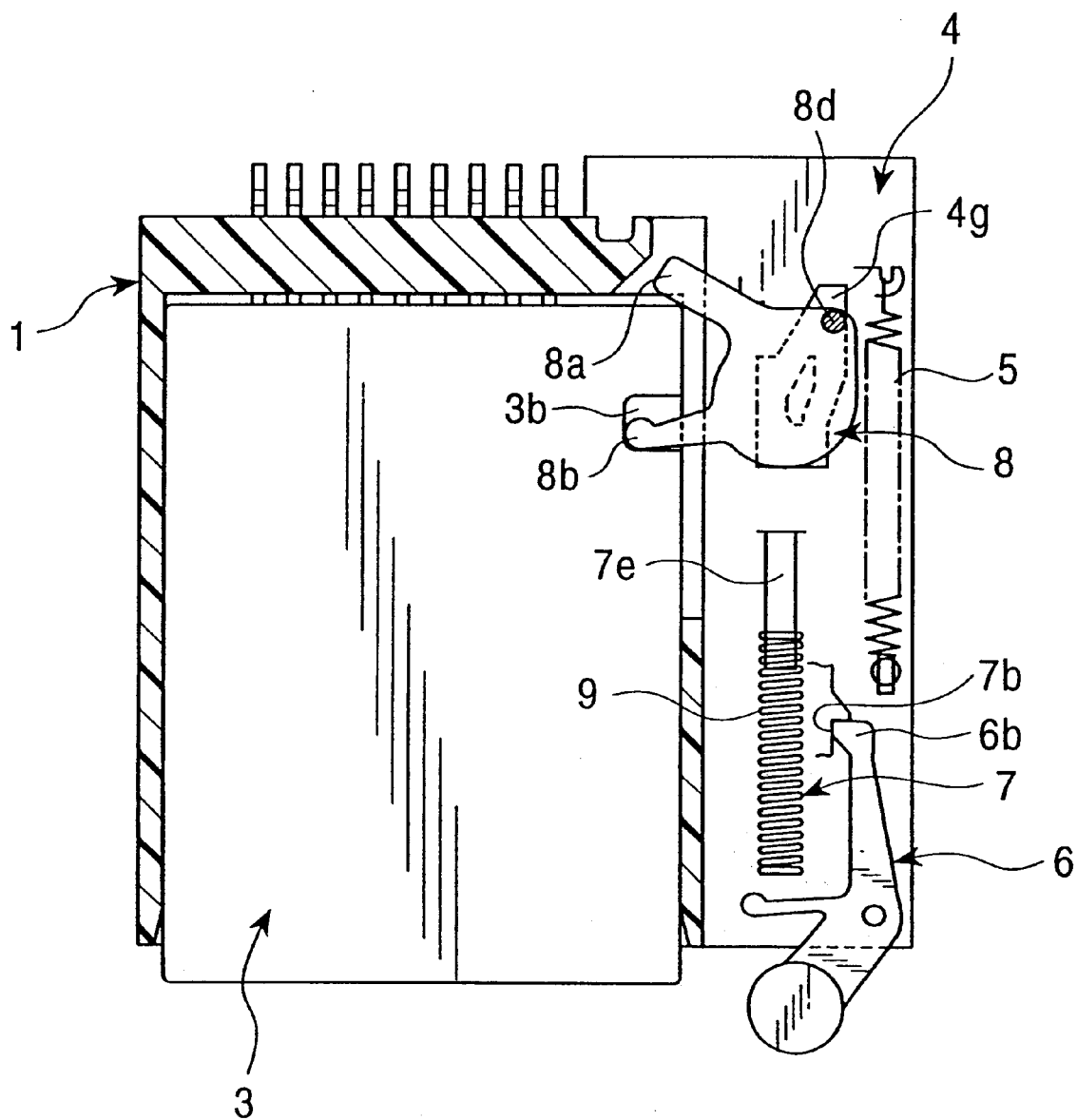
FIG. 22 is a plan view of a slide member is locked against a data storage card in a card connector according to an embodiment of the invention.
Figure 23:
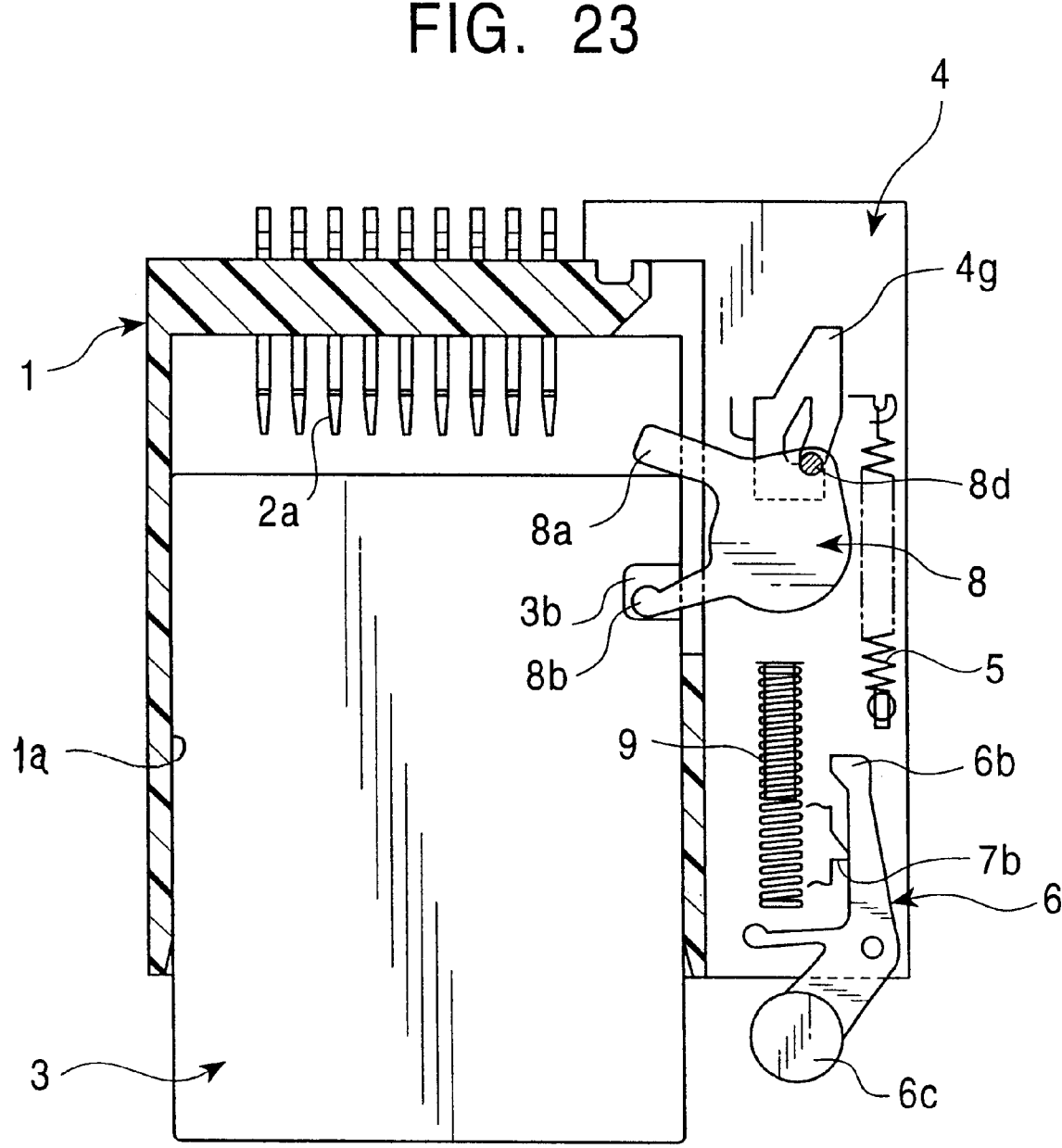
FIG. 23 is a plan view of a locked slide locked is released and the data storage card is discharged to a card discharge position in a card connector according to an embodiment of the invention.
Figure 24:
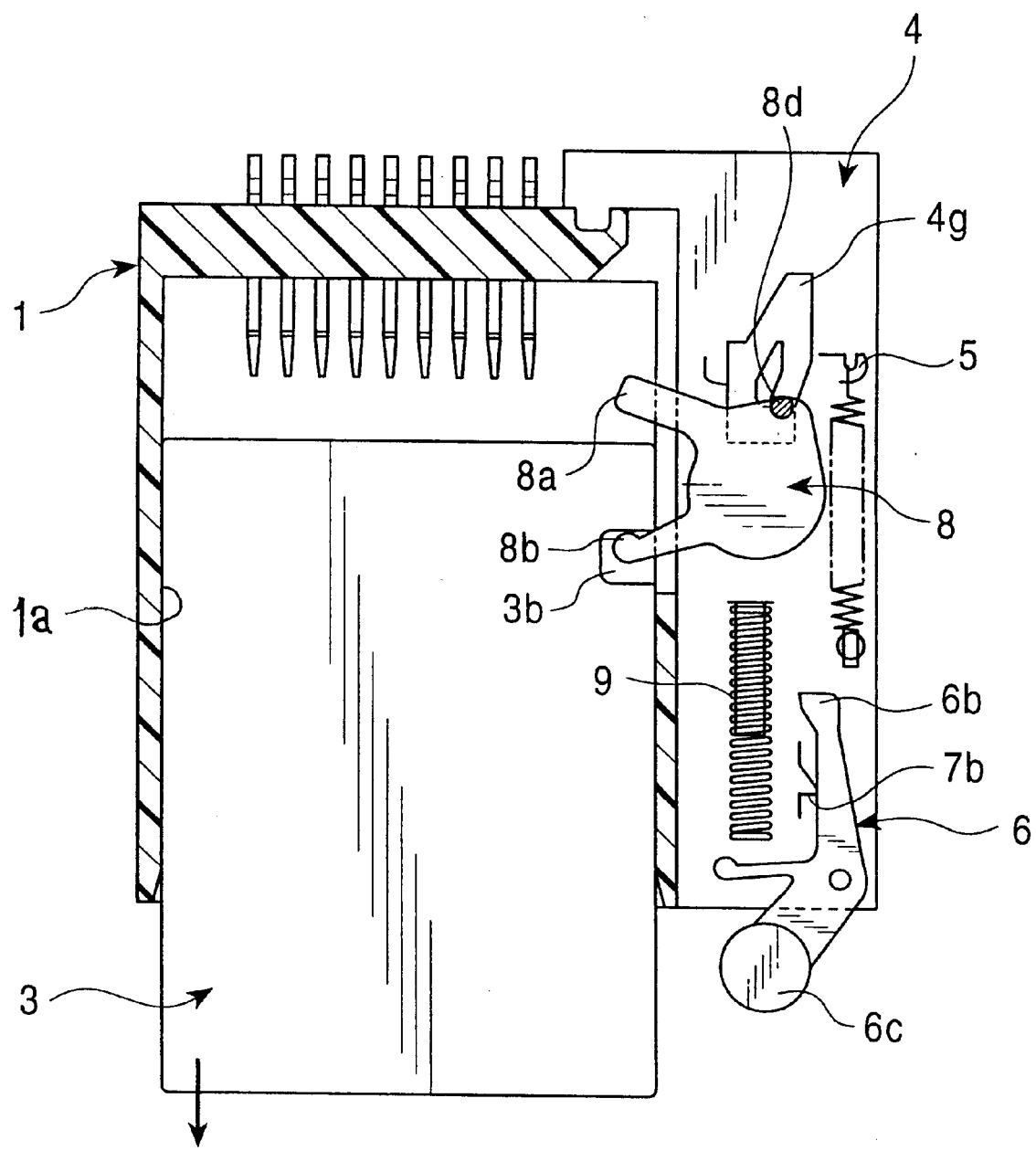
FIG. 24 is a plan view of a data storage card is drawn from the card discharge position in a card connector according to an embodiment of the invention.
Figure 25:
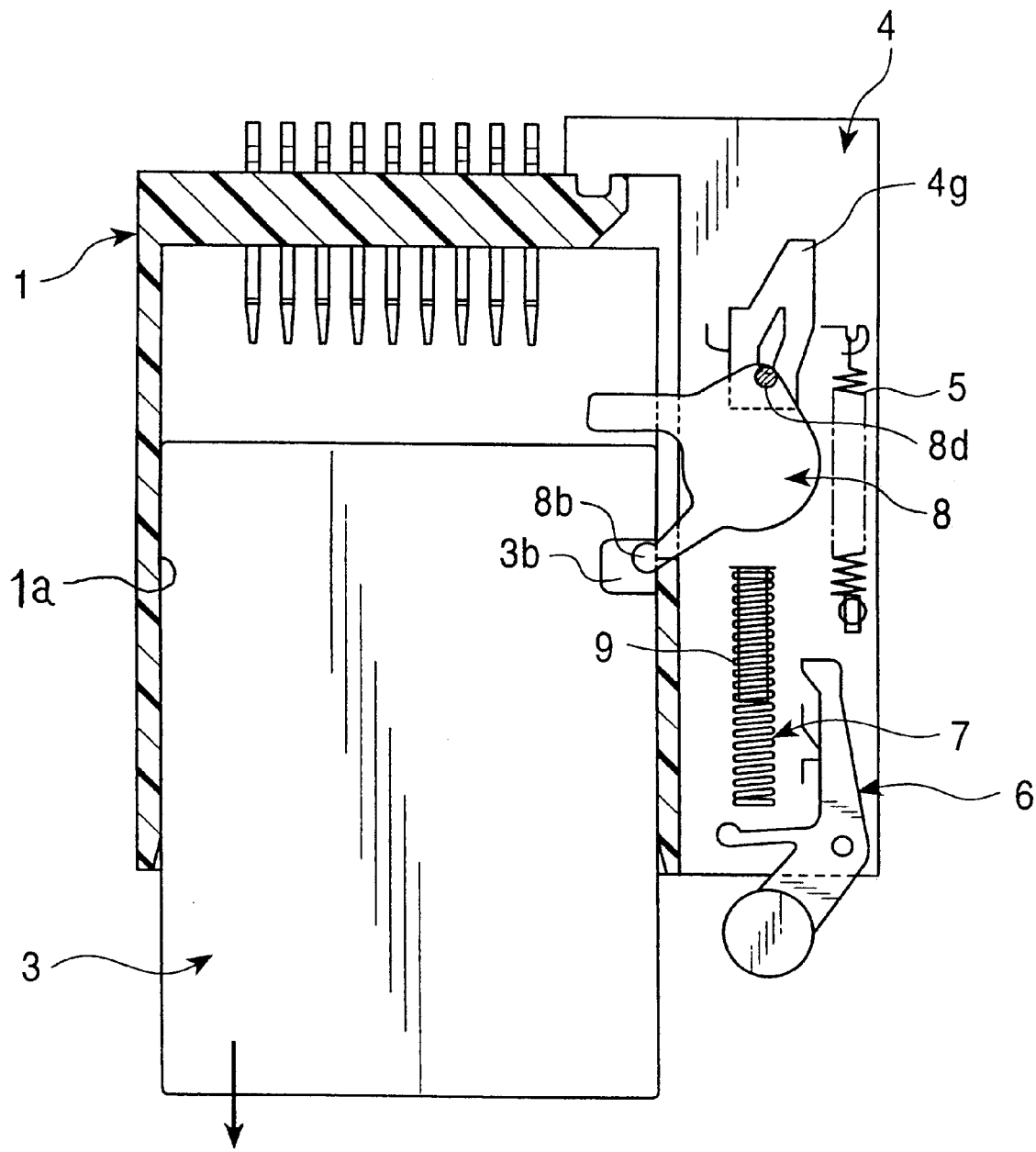
FIG. 25 is a plan view of an eject arm rotated in a discharge direction during the discharging of a data storage card in a card connector according to an embodiment of the invention.
Figure 26:
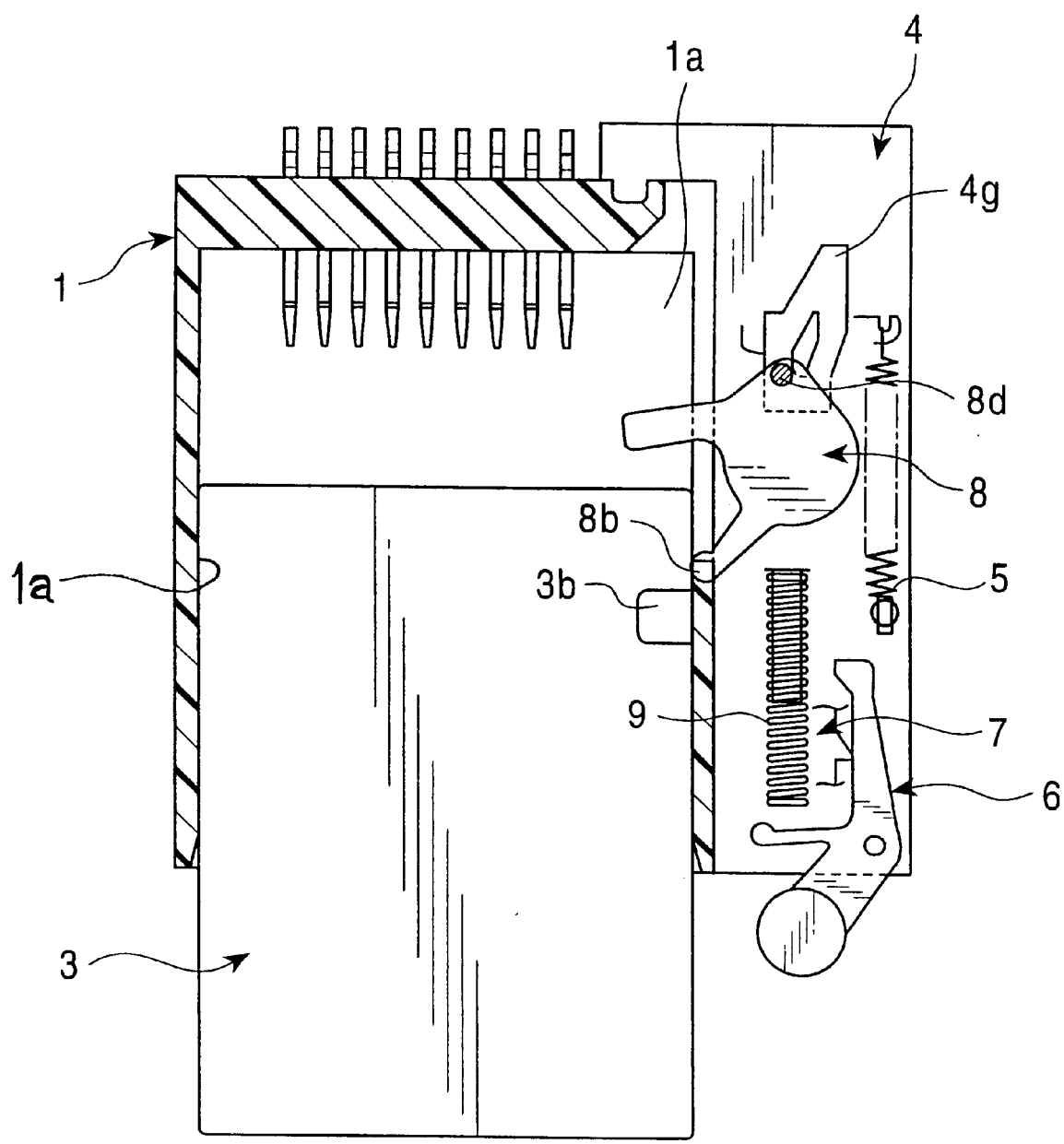
FIG. 26 is a plan view of a second arm portion released to discharge a data storage card in a card connector according to an embodiment of the invention.
Figure 27:
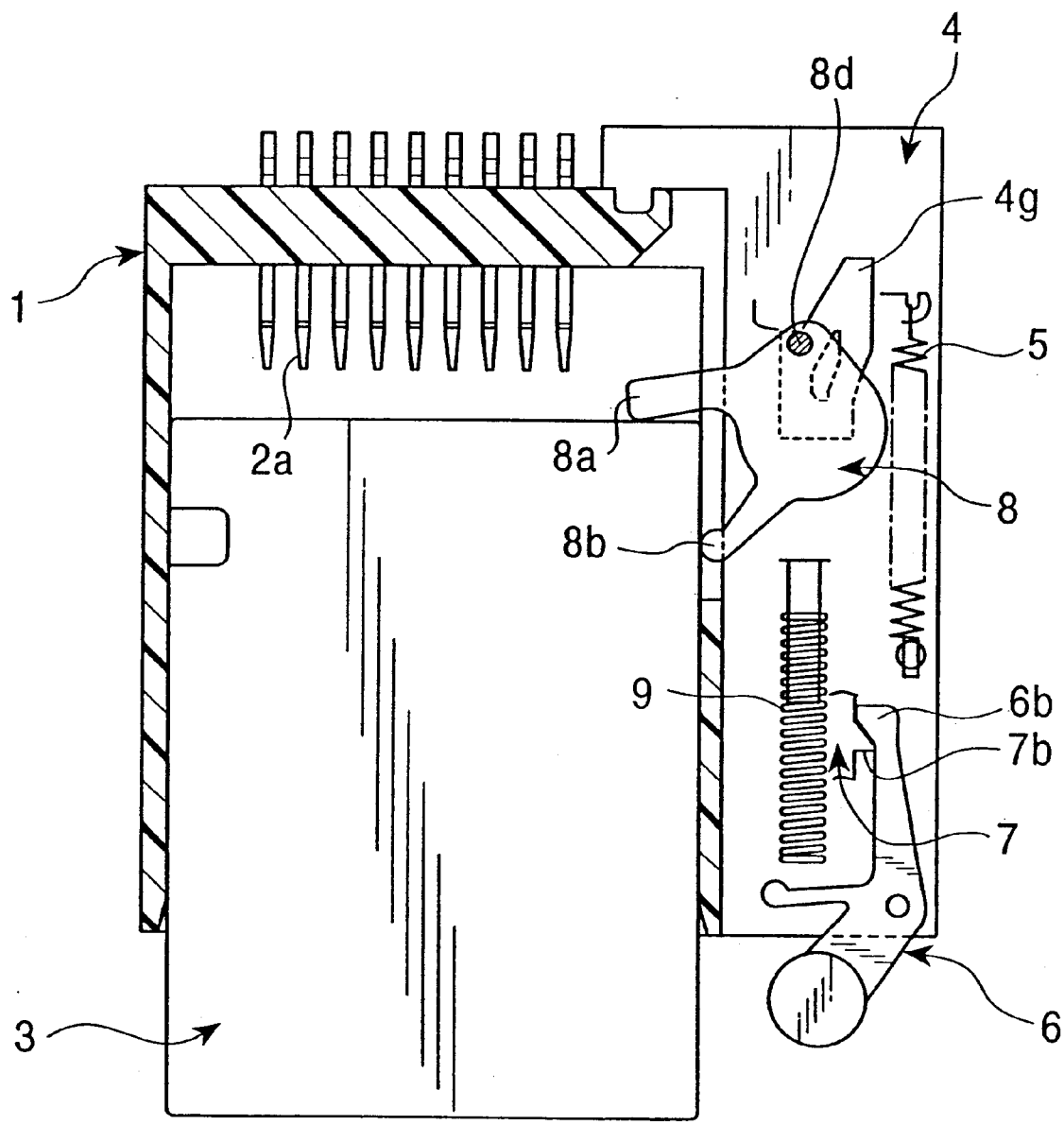
FIG. 27 is a plan view of a data storage card inserted upside down in a card connector according to an embodiment of the invention.

FIGS. 18 through 26 are diagrams illustrating the operating condition of the card connector of an embodiment of the invention when a data storage card is inserted or discharged. FIG. 18 is a plan view of a data storage card initially inserted into a housing. FIG. 19 is a plan view of a data storage card being inserted. FIG. 20 is a plan view of a data storage card engaged by a second arm portion while being inserted. FIG. 21 is a plan view of a data storage card inserted in a card connector. FIG. 22 is a plan view of a slide member locked by a data storage card. FIG. 23 is a plan view of a data storage card discharged to a card discharge position. FIG. 24 is a plan view of a data storage card drawn from the card discharge position. FIG. 25 is a plan view of an eject arm rotated in the discharge direction during the discharging of the card. FIG. 26 is a plan view of a second arm portion released to discharge the card. FIG. 27 is a plan view of a data storage card inserted upside down.

The card 3 is inserted into the accommodating portion 1*a* of the housing 1. At this time, the first arm portion 8*a* of the eject arm 8 abuts the forward end portion of the card 3. The first arm portion 8*a* is pressed in the card inserting direction (See FIG. 18).

The movement of the cam pin 8*d* of the eject arm 8 is restricted by the cam groove portion 4*g* of the frame 4. The first arm portion 8*a* is not rotated in the card inserting direction. The slide member 7 moves in the card inserting direction against the biasing force of the return spring 5. The cam pin 8*d* provided on the eject arm 8 moves in the cam groove portion 4*g* provided in the frame 4. The cam pin 8*d* moves in the card inserting direction along the first longitudinal groove 4*ga* and the first inclined groove 4*gc* (See FIG. 17). While the cam pin 8*d* moves along the first inclined groove 4*gc,* the eject arm 8 rotates by a fixed distance while being restricted in the card inserting direction (See FIG. 19).

Further, when the card 3 is pressed in the inserting direction against the biasing force of the return spring 5, the slide member 7 moves in the card inserting direction. The cam pin 8*d* moves from the first inclined groove 4*gc* to the second longitudinal groove 4*gb* (See FIG. 17). At this time, the eject arm 8 rotates by a fixed distance in the card inserting direction. Through this rotation, the contact portions 3*a* of the card 3 are brought into contact with the contact terminals 2*a* of the housing 1 (See FIG. 20).

When the card 3 is further pressed in the inserting direction, the cam pin 8*d* further moves in the card inserting direction along the second longitudinal groove 4*gb* (See FIG. 17). When the card 3 abuts the inner edge portion of the accommodating portion 1*a* of the housing 1, the insertion is stopped. The attachment of the card 3 to the housing 1 is completed. The movement of the slide member 7 and the eject arm 8 is also stopped. The lock member 6*b* of the retaining member 6 is positioned in the lock recess 7*b* of the slide member 7 (See FIG. 21).

Next, when the pressing of the card 3 is released, the slide member 7 is slightly retracted in the card discharging direction due to the biasing force of the return spring 5. The lock recess 7*b* is engaged with the lock member 6*b*. The slide member 7 is locked at that position. The cam pin 8*d* is positioned in the central portion of the second longitudinal groove of the cam groove portion 4*g* (See FIG. 22).

In this way, when inserting the card 3, the rotation of the eject arm 8 is restricted by the cam groove portion 4*g* until the slide member 7 moves in the card inserting direction and is locked. The operation of inserting the card 3 can be reliably conducted.

When discharging the card 3 attached to the housing 1, the operating portion 6*c* of the retaining member 6 may be depressed by an operator, user, or the like (See FIG. 22). The lock member 6*b* provided on the retaining member 6 is detached from the lock recess 7*b* of the slide member 7, and the slide member 7 is moved in the card discharging direction by the biasing force of the return spring 5. The cam pin 8*d* is moved along the second longitudinal groove 4*gb* and the second inclined groove 4*gd* toward the joint portion connected to the lateral groove 4*ge* (See FIG. 17). The eject arm 8 moves in the card discharging direction with the slide member. The rotation of the eject arm 8 is restricted. The base portion of the spring retaining portion 7*e* of the slide member 7 abuts the end portion of the coil spring 9. The movement of the slide member is stopped and the card 3 is stopped at the discharging position (See FIG. 23).

The second arm 8*b* is engaged with the recess 3*b* of the card 3. The rotation of the cam pin 8*d* is restricted by the inclined groove 4*gd.* The card 3 moves in the discharging direction with the slide member 7 in a state in which it is engaged with the second arm portion 8*b*. The contact of the contact portions 3*a* of the card 3 disconnect from the contact terminals 2*a* of the housing 1 (See FIG. 23).

In this case, the second arm portion 8*b* is engaged with the recess 3*b* of the card 3. The rotation of the cam pin 8*d* is restricted by the longitudinal groove 4*gb* and the second inclined groove 4*gd* (See FIG. 17). During movement of the slide member 7 from the card attachment state in the card discharging direction, the card 3 does not exit from the accommodating portion 1*a* of the housing 1.

When the card 3 is further drawn out, the slide member 7 moves to the front side against the biasing force of the coil spring 9. The cam pin 8*d* moves along the second longitudinal groove 4*gb* in the direction of the lateral groove 4*ge* (See FIG. 17). The eject arm 8 is brought to a state in which it can rotate in the card discharging direction (See FIG. 24).

When in this state the card 3 is further drawn out, the cam pin 8*d* moves along the lateral groove 4*ge* in the direction of the joint portion connected to the first longitudinal groove 4*ga* (See FIG. 17). The eject arm 8 is rotated in the direction in which the card 3 is discharged (See FIG. 25).

With the rotation of the eject arm 8 in the card discharging direction, the second arm portion 8*b* no longer engages the recess 3*b* of the card. The card 3 is discharged from the accommodating portion 1*a* of the housing 1. The slide member 7 moves in the card inserting direction by the biasing force of the coil spring 9. The cam pin 8*d* moves in the card inserting direction along the first longitudinal groove 4*ga* to return to the initial position.

After canceling the lock of the slide member 7, if the card is not drawn out but is inserted again from the card discharging position, a user operator presses the card 3 at the discharging position (See FIG. 23). The first arm portion 8*a* of the eject arm 8 abuts the forward end portion of the card 3. The first arm portion 8*a* is pressed in the card inserting direction. The cam pin 8*d* is in the second inclined groove 4*gd.* The rotation is restricted by the second inclined groove 4*gd* and the second longitudinal groove 4*gb*. The cam pin 8*d* moves in the card inserting direction along the second inclined groove 4gd and the second longitudinal groove 4gb.

The insertion is stopped when the card 3 abuts the inner edge of the accommodating portion 1a of the housing 1. The attachment of the card 3 to the housing 1 is completed. The movement of the slide member 7 and the eject arm 8 is also stopped. The lock member 6b of the retaining member 6 is positioned in the lock recess 7b of the slide member 7 (See FIG. 21).

When the pressing of the card 3 is stopped, the slide member 7 slightly returns in the card discharging direction by the biasing force of the return spring 5. The lock recess 7b engages the lock member 6b to lock the slide member 7 at that position. The cam pin 8d is positioned in the central portion of the second longitudinal groove of the cam groove portion 4g (See FIG. 22).

In this way, when inserting the card 3 again from the discharging position, the rotation of the eject arm 8 is restricted by the cam groove portion 4g until the slide member 7 moves in the card inserting direction to be locked. The operation of inserting the card 3 may be reliably conducted.

FIG. 27 shows a condition in which the card 3 is inserted upside down. The recess 3b provided in the card 3 is positioned on the opposite side of the mounting position of the eject arm 8. During the insertion of the card 3, the second arm portion 8b cannot be engaged with the recess 3b. The eject arm 8 moves in the card inserting direction, with its rotation being hindered. At this time, the cam pin 8d moves along the first longitudinal groove 4ga. However, in the joint portion connected to the first inclined groove 4gc, it cannot move in the direction of the inclined groove 4gc. Further movement in the card inserting direction is hindered by the stopper portion 4gf provided on the wall portion of the joint portion.

The card 3 cannot be further inserted in the inserting direction. It is possible to prevent the contact terminals 2a arranged in the housing 1 from being broken.

Further, the slide member 7 is not moved to the position where it is locked by the retaining member 6. When the pressing of the card 3 is stopped, the card 3 is returned to the card insertion initial position by the returning force of the return spring 5. It is possible to check whether the card has been erroneously inserted.

In this embodiment, the contact portions 3a and the contact terminals 2a are brought into face contact. However, a pin/socket connection system may be used such as that for an IC card.

Also in this embodiment, the retaining member 6 is operated by a user or operator. However, an automatic ejection system may be used such as a motor or a solenoid.

As described above, the eject arm 8 is mounted to a slide member 7 which is slidable in the card inserting and discharging directions. In one aspect, there is provided an operation restricting mechanism for restricting the movement of the eject arm so that the eject arm does not disengage from the card. The operation of inserting the card may be reliably conducted. It is possible to prevent the card from exiting out of the accommodating portion of the housing while the slide member moves from the card attachment state in the card discharging direction.

In one aspect, the operation restricting device may comprise a rotation restricting portion and a rotation permitting portion. The rotation restricting portion restricts the rotation of the eject arm while the slide member moves in the card inserting direction and the card discharging direction. The rotation permitting portion permits the rotation of the eject arm after the slide member stops sliding at the discharging position in the card discharging direction. It is possible to reliably conduct the card inserting and discharging operation with a simpler construction.

In one aspect, there is provided a coil spring 9 which abuts the slide member 7 for positioning when the slide member 7 moves in the card discharging direction. By drawing out the card 3, the eject arm 8 and the slide member 7 can move in the discharging direction due to the deflection of the coil spring 9. It is possible to mitigate the impact applied to the eject arm 8 when the slide member 7 stops at the discharging position. It is possible to prevent the second arm portion 8b from being detached from the recess 3b of the card 3. Further, it is possible to prevent the card 3 from exiting the card connector until it is removed.

The card 3 may move in the card discharging direction with the slide member 7. When the slide member 7 has moved to the card discharging position, the drawing out of the card is possible. In one aspect, the movement of the eject arm 8 is restricted by the operation restricting mechanism.

The card 3 again may be attached to the card attachment position from the discharging position. The inserting operation may be conducted again without drawing out the card 3, to achieve an improvement in operability.

Further, first and second arm portions 8a and 8b may be formed on the eject arm 8. When inserting the card, the first arm portion 8a is engaged with the card to rotate the eject arm 8. When discharging the card, the second arm portion 8b is engaged with the card to rotate the eject arm 8. The operation of inserting and discharging the card into and from the housing may be facilitated, making it possible to reliably conduct the operation.

Further, the operation restricting device may be formed by a cam pin 8d and a stationary member. The cam pin may be provided on the eject arm. The stationary member may be provided with a cam groove portion engaged to the cam pin. Thus, a reliable operation may be achieved with a simpler construction.

Further, the stationary member may be formed as part of the housing 1, as part of the frame 4 mounted on the housing, as a separate component (not shown), and the like 1. It is possible to provide a card connector simpler in construction and less expensive.

Further, the cam groove portion 4g may be formed in a loop-like configuration (see FIG. 17) and may comprise a first rotation restricting portion, a second rotation restricting portion, and a rotation permitting portion. The first rotation restricting portion may consist of a first longitudinal groove 4ga extending in the direction in which the slide member 7 slides and a first inclined groove 4gc connected to the first longitudinal groove 4ga. The second rotation restricting portion may consist of a second longitudinal groove 4gb and a second incline groove 4gd. The second longitudinal groove 4gb may be connected to the end portion of the first inclined groove 4gc and may extend parallel to the first longitudinal groove 4ga. The second inclined groove 4gd may be connected to the second longitudinal groove 4gb. The rotation permitting portion may connect to the end portion of the second inclined groove 4gd and may connect to the end portion of the first longitudinal groove 4ga. The operation of inserting and discharging the card may be reliably conducted with a simpler construction.

In one aspect, a stopper portion 4gf is formed on the wall portion of the joint portion between the first longitudinal groove 4ga and the first inclined groove 4gc. The stopper portion 4gf may abut the cam pin 8d and prevent the movement of the cam pin 8d in the inserting direction when the card 3 is inserted upside down or reversely. It is possible to prevent the contact terminals 2a arranged in the housing from being inadvertently damaged. Further, an erroneous insertion may be easily detected.

When inserting the card, the slide member 7 moves in the inserting direction with the first arm portion 8a being engaged with the card. During movement of the slide member 7, the cam pin 8d moves along the first longitudinal groove 4ga and the first inclined groove 4gc, which may constitute the first rotation restricting portion. The eject arm 8 rotates while being restricted in its movement. The second arm portion 8b engages with a recess 3b provided in the card. The slide member 7 is locked by the retaining member 6 to retain the card at the attaching position. When discharging the card, the slide member 7 moves in the discharging direction with the second arm portion 8b being engaged with the card 3 with the releasing of the lock of the retaining member 6. During movement of the slide member 7, the cam pin 8d moves along the second longitudinal groove 4gb and the second inclined groove 4gd, which may constitute the second rotation restricting member. The eject arm 8 rotates while being restricted in its movement. The slide member 7 may abut the coil spring 9 at the card discharge position to stop rotation of the eject arm 8. The card 3 may be retained at the discharge position by the second arm portion 8b. When extracting the card from the discharge position, the eject arm 8 and the slide member 7 move in the card discharge direction against the biasing force of the coil spring 9. The cam pin 8d moves along the lateral groove 4ge, which may constitute the rotation permitting portion. The eject arm 8 is rotated, and the second arm portion 8b disengages from the card 3, making it possible to discharge the card 3 in the discharge direction. By restricting the rotation of the eject arm 8 through a combination of the engagement structure of the cam pin 8d and the cam groove portion 4g, it is possible to reliably conduct the operation of inserting and discharging the card 3 with a simpler construction.

Various embodiments of the invention have been described and illustrated. However, the description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A card connector comprising:

a housing;

a card disposed to attach and detach from the housing;

a slide member operatively disposed to slide in a card inserting direction and in a card discharging direction;

an eject arm mounted on the slide member and operatively disposed to engage the card, the eject arm provided to be movable in the card inserting and discharging directions;

a return spring operatively disposed to bias the slide member in the card discharging direction;

a retaining member operatively disposed to retain the slide member at a card insertion position against the biasing force of the return spring; and an operation restricting device operatively disposed to restrict the movement of the eject arm during the sliding of the slide member;

wherein a first arm portion and a second arm portion are formed on the eject arm, wherein when inserting the card, the first arm portion is engaged with the card to rotate the eject arm, and wherein when discharging the card, the second arm portion is engaged with the card to rotate the eject arm.

2. A card connector according to claim 1, wherein the operation restricting device comprises:

a rotation restricting portion disposed to restrict the rotation of the eject arm during the sliding of the slide member in the card inserting and card discharging directions; and a rotation permitting portion disposed to permit the rotation of the eject arm after the slide member stops the sliding at the discharge position in the card discharge direction.

3. A card connector according to claim 1, further comprising a coil spring against which the slide member abuts when the slide member moves to a card discharging position to effect positioning, wherein by drawing out the card, the eject arm and the slide member can move in the discharging direction due to the deflection of the coil spring, the eject arm rotating with the movement of the slide member.

4. A card connector according to claim 1, wherein the card is movable in the card discharging direction with the slide member, the extraction of the card being possible when the slide member has moved to a card discharging position, and wherein the movement of the eject arm is restricted by the operation restricting device such that the card can be attached again from the discharge position to the card attaching position.

5. A card connector comprising:

a housing;

a card disposed to attach and detach from the housing;

a slide member operatively disposed to slide in a card inserting direction and in a card discharging direction;

an eject arm mounted on the slide member and operatively disposed to engage the card, the eject arm provided to be movable in the card inserting and discharging directions;

a return spring operatively disposed to bias the slide member in the card discharging direction;

a retaining member operatively disposed to retain the slide member at a card insertion position against the biasing force of the return spring; and an operation restricting device operatively disposed to restrict the movement of the eject arm during the sliding of the slide member;

wherein the operation restricting mechanism comprises a cam pin and a stationary member, the cam pin provided on the eject arm, the stationary member equipped with a cam groove portion operatively engaged to the cam pin.

6. A card connector according to claim 5, wherein the stationary member is formed by the housing.

7. A card connector according to claim 5, wherein the stationary member comprises a frame mounted to the housing.

8. A card connector according to claim 5, wherein the cam groove portion is formed in a loop-like configuration.

9. A card connector according to claim 8, wherein the cam groove portion comprises:

a first rotation restricting portion having a first longitudinal groove and a first inclined groove, the first longitudinal groove extending along the sliding direction of the slide member, the first inclined groove connected to the first longitudinal groove;

a second rotation restricting portion having a second longitudinal groove and a second inclined groove, the second longitudinal groove extending parallel to the first longitudinal groove, the second inclined groove connected to the second longitudinal groove; and a rotation permitting portion having a lateral groove connected to the second inclined groove and connected to the first longitudinal groove.

10. A card connector according to claim 7, wherein a stopper portion is formed on a wall portion of a connecting portion between the first longitudinal groove and the first inclined groove, the stopper portion to abut the cam pin and prevent the cam pin from moving in the inserting direction when the card is inserted at least one of upside down and in the reverse direction.

11. A card connector according to claim 9, wherein a first arm portion and a second arm portion are formed on the eject arm, wherein when inserting the card, the slide member moves in the card inserting direction with the first arm portion being engaged with the card, and during movement of the slide member, the cam pin moves along the first longitudinal groove and the first inclined groove, whereby the eject arm rotates while having restricted movement and the second arm portion engages with a recess provided in the card, and the slide member is locked by the retaining member to retain the card at an attaching position, wherein when discharging the card, the slide member moves in the card discharging direction with the second arm portion being engaged with the card with the releasing of a lock of the retaining member, and during the movement of the slide member, the cam pin moves along the second longitudinal groove and the second inclined groove, whereby the eject arm rotates while having restricted movement, and the slide member abuts the coil spring at the card discharge position to stop rotation of the reject arm, and the card is retained at the discharge position by the second arm portion, and wherein when extracting the card from a discharge position, the eject arm and the slide member move in the card discharge direction against the biasing force of the coil spring, the cam pin moves along the lateral groove, whereby the eject arm is rotated, and the engagement of the second arm portion and the card is released.

12. A card connector comprising:

a housing;

a slide member operatively disposed on the housing, the slide member slidably mounted to slide in a card inserting direction and in a card discharging direction, the slide member biased by a biasing force in the card discharging direction;

an eject arm mounted on the slide member, the eject arm operatively disposed to move in the card inserting and discharging directions;

a retaining member operatively disposed to retain the slide member at a card insertion position against the biasing force; and an operation restricting mechanism operatively disposed to restrict the movement of the eject arm during the sliding of the slide member;

wherein the operation restricting mechanism comprises, a cam pin provided on the eject arm, and a stationary member forming a cam groove portion, the cam groove portion operatively engaged to the cam pin.

13. A card connector according to claim 12, wherein the housing forms the stationary member.

14. A card connector according to claim 12, wherein the stationary member comprises a frame connected to the housing.

15. A card connector according to claim 12, wherein the cam groove portion has a loop-like configuration.

16. A card connector according to claim 15, wherein the cam groove portion comprises:

a first rotation restricting portion to restrict movement of the eject arm in the card inserting direction;

a second rotation restricting portion to restrict movement of the reject arm in the card discharging direction; and a rotation permitting portion operatively connected to the first and second rotation restricting portions, the rotation permitting portion to permit movement of the eject arm.

17. A card connector according to claim 15, wherein the cam groove portion comprises:

a first rotation restricting portion having a first longitudinal groove connected to a first inclined groove;

a second rotation restricting portion having a second longitudinal groove connected to a second inclined; and a rotation permitting portion having a lateral groove connected to the second inclined groove and the first longitudinal groove.

18. A card connector according to claim 17, wherein the first longitudinal groove extends along a sliding direction of the slide member.

19. A card connector according to claim 18, wherein the second longitudinal groove extends parallel to the first longitudinal groove.

20. A card connector according to claim 17, wherein the cam groove portion forms a stopper portion between the first longitudinal groove and the first inclined groove, the stopper portion to prevent the cam pin from moving in the inserting direction.

21. A card connector according to claim 17, wherein when the slide member moves in the inserting direction, the cam pin moves along the first longitudinal groove and the first inclined groove, the eject arm rotates with restricted movement in the card inserting direction, the retaining member retains the slide member at a card attaching position, and wherein when the slide member moves in the discharging direction, the cam pin moves along the second longitudinal groove and the second inclined groove, the eject arm rotates with restricted movement in the card discharging direction, wherein the eject arm stops at a card discharge position.

22. A card connector according to claim 21, wherein when the slide member moves beyond the card discharge position in the card discharge direction, the cam pin moves along the lateral groove.

23. A card discharge mechanism for a card connector comprising:

a slide member;

an eject arm mounted on the slide member; and an operation restricting mechanism operatively disposed to restrict movement of the eject arm when the slide member is moved, wherein the operation restriction mechanism has
a stationary member forming a cam groove portion, and
a cam pin provided on the eject arm, the cam pin engaging the cam groove portion,
wherein a first arm portion and a second arm portion are formed on the eject arm, wherein when inserting the card, the first arm portion is engaged with the card to rotate the eject arm, and wherein when discharging the card, the second arm portion is engaged with the card to rotate the eject arm.

24. A card discharge mechanism according to claim 23, wherein the operation restricting mechanism is disposed to restrict movement of the eject arm during movement of the slide member in a card inserting direction and a card discharging direction, and wherein the operation restricting mechanism is disposed to permit rotation of the eject arm after the slide member stops movement in the card discharge direction.

25. A card discharge mechanism according to claim 23, wherein the cam groove portion has a loop-like configuration.

26. A card discharge mechanism according to claim 25, wherein the cam groove portion comprises:
a first rotation restricting portion;
a second rotation restricting portion; and
a rotation permitting portion operatively connected to the first and second rotation restricting portions.

27. A card discharge mechanism according to claim 26,
wherein the first rotation restricting portion restricts movement of the eject arm in a card inserting direction;
wherein the second rotation restricting portion restricts movement of the eject arm in a card discharging direction; and
wherein the rotation permitting portion permits movement of the eject arm.

28. A card discharge mechanism according to claim 27,
wherein the first rotation restricting portion comprises a first longitudinal groove connected to a first inclined groove,
wherein the second rotation restricting portion comprises a second longitudinal groove connected to a second inclined groove, and
wherein the rotation permitting portion comprises a lateral groove connected to the second inclined groove and the first longitudinal groove.

29. A card discharge mechanism according to claim 28, wherein the first longitudinal groove extends along a sliding direction of the slide member.

30. A card discharge mechanism according to claim 28, wherein the second longitudinal groove extends parallel to the first longitudinal groove.

31. A card discharge mechanism according to claim 23, wherein the stationary member has a stopper portion.

32. A card discharge mechanism according to claim 28, wherein a stopper portion is formed between the first longitudinal groove and the first inclined groove.

33. A card discharge mechanism according to claim 28,
wherein when the slide member moves in a card inserting direction, the cam pin moves along the first longitudinal groove and the first inclined groove, the eject arm rotates in the card inserting direction, and
wherein when the slide member moves in a card discharging direction, the cam pin moves along the second longitudinal groove and the second inclined groove, the eject arm rotates in the card discharging direction.

34. A card discharge mechanism according to claim 33, wherein when the slide member moves beyond a card discharge position in the card discharging direction, the cam pin moves along the lateral groove.

35. A card discharge mechanism according to claim 33, wherein the eject arm rotates within essentially a fixed distance in at least one of the card inserting direction and the card discharging direction when the slide member moves.

36. A card discharge mechanism according to claim 35, wherein when the slide member moves beyond a card discharge position, the eject arm rotates beyond the fixed distance.

37. A card discharge mechanism according to claim 23, further comprising a retaining member to retain the slide member at an inserting position.

* * * * *

UNITED STATES PATENT AND TRADEMARK OFFICE
CERTIFICATE OF CORRECTION

PATENT NO.     : 6,315,583 B1
DATED          : November 13, 2001
INVENTOR(S)    : Toru Nishioka It is certified that error appears in the above-identified patent and that said Letters Patent is hereby corrected as shown below:

<u>Column 11,</u>
Line 65, delete "to retain the" and substitute -- to bias the -- in its place.

<u>Column 14,</u>
Line 20, delete "permit ting" and substitute -- permitting -- in its place.

Signed and Sealed this

Third Day of December, 2002

JAMES E. ROGAN
*Director of the United States Patent and Trademark Office*